(12) United States Patent
Teramura et al.

(10) Patent No.: US 10,754,148 B2
(45) Date of Patent: Aug. 25, 2020

(54) OPTICAL SCANNING APPARATUS AND IMAGE FORMING APPARATUS

(71) Applicant: CANON KABUSHIKI KAISHA, Tokyo (JP)

(72) Inventors: Masayasu Teramura, Utsunomiya (JP); Yu Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/540,361

(22) Filed: Aug. 14, 2019

(65) Prior Publication Data
US 2020/0057299 A1  Feb. 20, 2020

(30) Foreign Application Priority Data
Aug. 20, 2018 (JP) .................. 2018-154097

(51) Int. Cl.
*G02B 26/10* (2006.01)
*G03G 15/04* (2006.01)

(52) U.S. Cl.
CPC ....... *G02B 26/105* (2013.01); *G03G 15/0409* (2013.01); *G03G 2215/0402* (2013.01)

(58) Field of Classification Search
CPC ............. G02B 26/105; G03G 15/0409; G03G 2215/0402
See application file for complete search history.

(56) References Cited

U.S. PATENT DOCUMENTS 9,217,863 B2  12/2015  Teramura
9,575,431 B2  2/2017  Teramura 10,012,938 B2  7/2018  Miyajima
10,054,790 B2  8/2018  Sumida et al.
10,401,770 B2  9/2019  Miyajima
(Continued)

FOREIGN PATENT DOCUMENTS

JP  2010072049 A  4/2010

*Primary Examiner* — Lamson D Nguyen
(74) *Attorney, Agent, or Firm* — Carter, DeLuca & Farrell LLP

(57) ABSTRACT

An optical scanning apparatus includes first and second deflecting units, and first and second imaging optical systems to guide first and second light fluxes deflected by the first and second deflecting units to first and second scanned surfaces. The first and second imaging optical systems include first and second imaging elements having the largest refractive power in a sub-scanning section. A distance on an optical path between the first deflecting unit and the first imaging element is shorter than that between the second deflecting unit and the second imaging element. The optical scanning apparatus satisfies:

$$-\frac{d_2}{N_2}\frac{\phi_{21}}{\phi_2} < -\frac{d_1}{N_1}\frac{\phi_{11}}{\phi_1},$$

where $N_1$, $d_1$, $\phi_1$, and $\phi_{11}$ are a refractive index, a thickness on an optical axis, a refractive power in a sub-scanning section, and a refractive power in the sub-scanning section of an incident surface, of the first imaging element, and $N_2$, $d_2$, $\phi_2$, and $\phi_{21}$ are equivalents of the second imaging element.

14 Claims, 9 Drawing Sheets

(56) References Cited

U.S. PATENT DOCUMENTS

| | | | |
|---|---|---|---|
| 2013/0057890 A1* | 3/2013 | Kudo | G03G 15/0409 358/1.13 |
| 2015/0205097 A1* | 7/2015 | Kudo | G02B 26/123 347/118 |
| 2016/0202393 A1 | 7/2016 | Saiga et al. | |
| 2019/0079430 A1* | 3/2019 | Kuribayashi | G03G 15/0409 |
| 2019/0163083 A1 | 5/2019 | Miyajima | |
| 2019/0286007 A1 | 9/2019 | Teramura | |
| 2020/0057402 A1* | 2/2020 | Teramura | G03G 15/0409 |

* cited by examiner

OPTICAL SCANNING APPARATUS AND IMAGE FORMING APPARATUS

BACKGROUND OF THE INVENTION

Field of the Invention

The present invention relates to an optical scanning apparatus, which is especially suitable for an image forming apparatus such as a laser beam printer (LBP), a digital copier, and a multifunction printer (MFP).

Description of the Related Art

Small optical scanning apparatuses have been developed in recent years in order to achieve reduction in size of color image forming apparatuses.

However, such reduction in the size of the optical scanning apparatus leads to reduction in space inside the optical scanning apparatus, thus complicating arrangement of optical elements therein so as to avoid interferences with one another.

Japanese Patent Application Laid-Open No. 2010-072049 discloses an optical scanning apparatus in which layouts of imaging optical elements are set different among a plurality of imaging optical systems to avoid interferences among the optical elements.

However, in the optical scanning apparatus disclosed in Japanese Patent Application Laid-Open No. 2010-072049, magnifications in a sub-scanning section vary among the plurality of imaging optical systems due to the difference in layout of the imaging optical elements.

For this reason, the imaging optical systems are different from one another in efficiency of taking in guided light flux (light use efficiency). As a consequence, a difference in amount of light may develop among irradiating light beams that irradiate scanned surfaces corresponding to the imaging optical systems.

Given the situation, it is an object of the present invention to provide an optical scanning apparatus which is capable of achieving reduction in size while reducing a difference in amount of light that may develop among scanned surfaces.

SUMMARY OF THE INVENTION

An optical scanning apparatus according to the present invention includes: first and second deflecting units configured to scan first and second scanned surfaces in a main scanning direction by deflecting first and second light fluxes, respectively; and first and second imaging optical systems configured to guide the first and second light fluxes deflected by the first and second deflecting units to the first and second scanned surfaces, respectively. The first and second imaging optical systems include first and second imaging elements, respectively, each imaging element having the largest refractive power in a sub-scanning section including an optical axis in the corresponding one of the first and second imaging optical systems. A distance on an optical path from the first deflecting unit to the first imaging element is shorter than a distance on an optical path from the second deflecting unit to the second imaging element. Moreover, the optical scanning apparatus satisfies a condition defined as $$-\frac{d_2}{N_2}\frac{\phi_{21}}{\phi_2} < -\frac{d_1}{N_1}\frac{\phi_{11}}{\phi_1},$$

where $N_1$, $d_1$, $\phi_1$, and $\phi_{11}$ represent a refractive index, a thickness on the optical axis, a refractive power in the sub-scanning section, and a refractive power in the sub-scanning section of an incident surface, of the first imaging element, and $N_2$, $d_2$, $\phi_2$, and $\phi_{21}$ represent a refractive index, a thickness on the optical axis, a refractive power in the sub-scanning section, and a refractive power in the sub-scanning section of an incident surface, of the second imaging element.

Further features of the present invention will become apparent from the following description of exemplary embodiments with reference to the attached drawings.

DESCRIPTION OF THE EMBODIMENTS

Optical scanning apparatuses according to embodiments of the present invention will be described below in detail with reference to the accompanying drawings. Note that the drawings shown below may be illustrated with dimensions that are different from actual scales in order to facilitate the understanding of the embodiments.

In the following description, a main scanning direction is a direction perpendicular to a rotation axis of a deflecting unit and to an optical axis of an optical system. A sub-scanning direction is a direction parallel to the rotation axis of the deflecting unit. A main scanning section is a cross-section perpendicular to the sub-scanning direction. A sub-scanning section is a cross-section perpendicular to the main scanning direction.

Therefore, it is to be noted that the main scanning direction and the sub-scanning section in an incident optical system are different from those in an imaging optical system in the following description.

First Embodiment

Figure 1A:
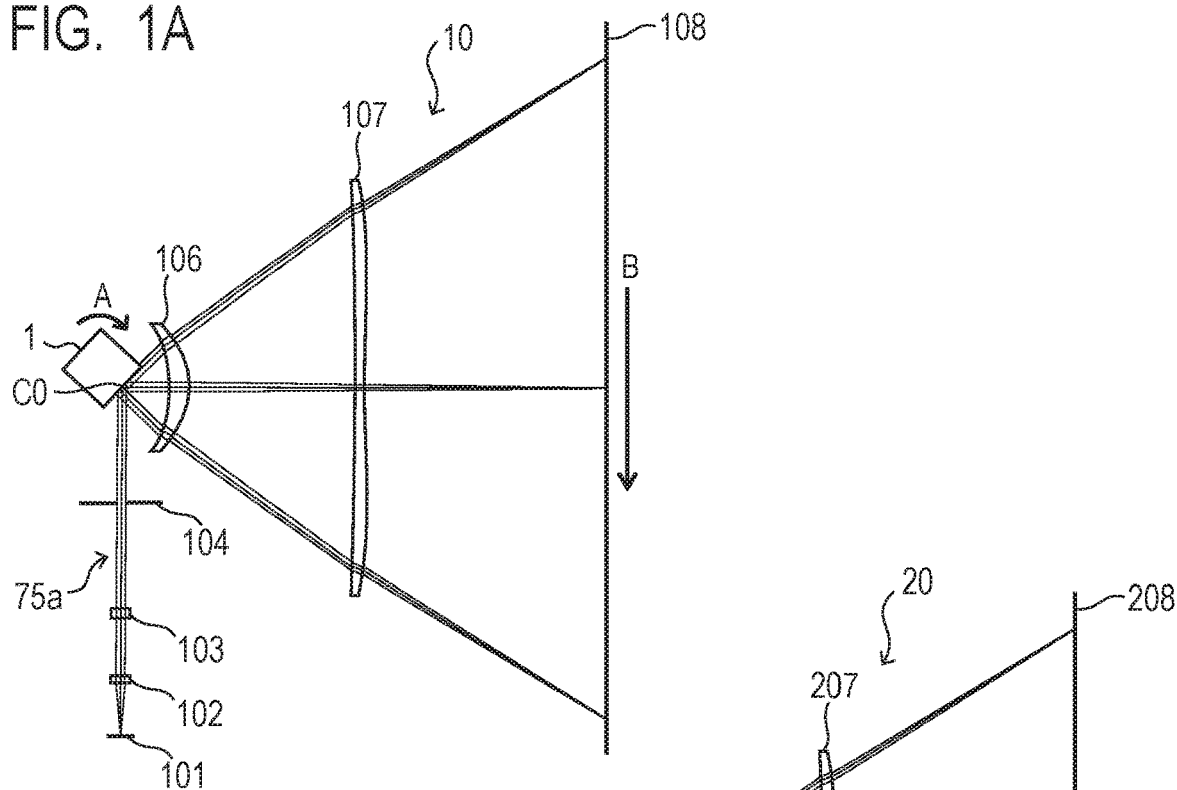
FIG. 1A is a development view in a main scanning section of part of an optical scanning apparatus according to a first embodiment.
Figure 1B:
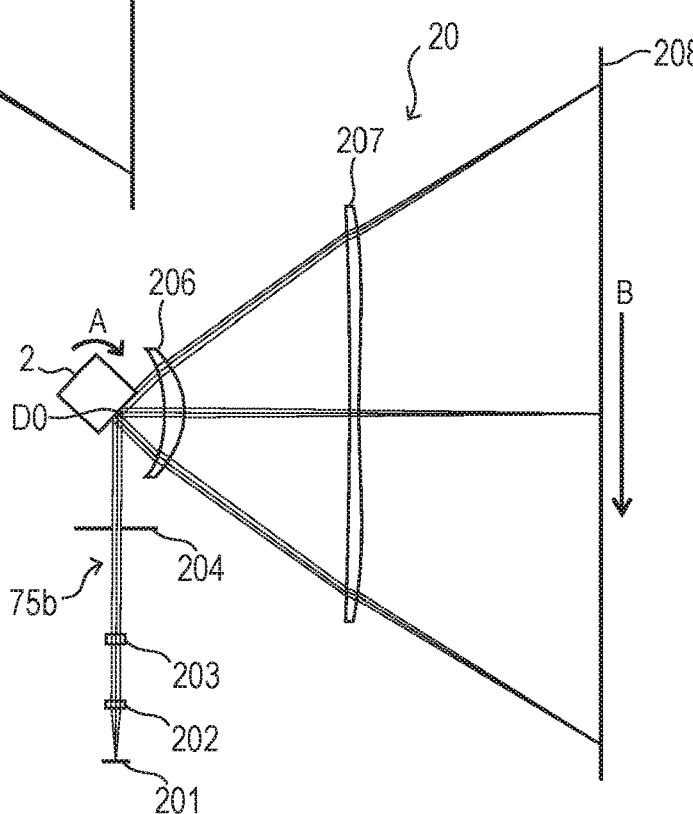
FIG. 1B is a development view in another main scanning section of part of the optical scanning apparatus according to the first embodiment.
Figure 1C:
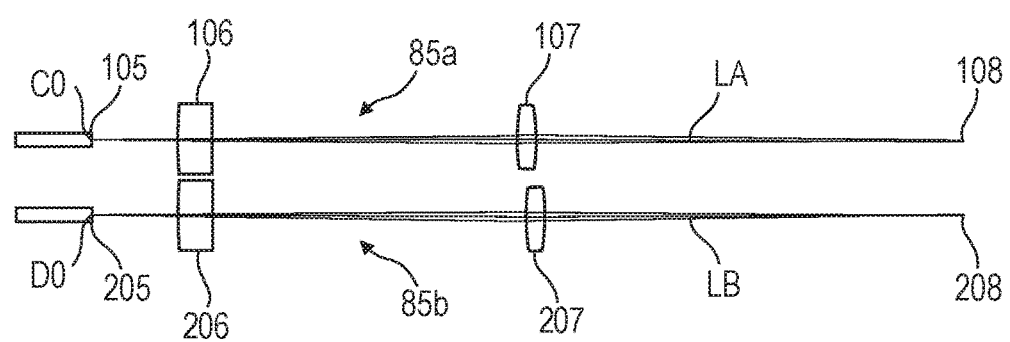
FIG. 1C is a development view in a sub-scanning section of imaging optical systems included in the optical scanning apparatus according to the first embodiment.

FIGS. 1A and 1B show development views in a main scanning section of part of an optical scanning apparatus 10 according to a first embodiment, respectively. FIG. 1C shows a development view in a sub-scanning section of imaging optical systems (scanning optical systems) included in the optical scanning apparatus 10 according to the first embodiment.

The optical scanning apparatus 10 of this embodiment includes first and second light sources 101 and 201, first and second collimator lenses 102 and 202, first and second cylindrical lenses 103 and 203, and first and second aperture stops 104 and 204.

Moreover, the optical scanning apparatus 10 of this embodiment includes first and second deflecting units 1 and 2, first fθ lenses 106 and 206, (fifth and sixth imaging elements), and second fθ lenses 107 and 207 (first and second imaging elements).

Here, on each optical path, the first fθ lens 106 is located between the first deflecting unit 1 and the second fθ lens 107, and the first fθ lens 206 is located between the second deflecting unit 2 and the second fθ lens 207.

Semiconductor laser or the like is used for each of the first and second light sources 101 and 201.

The first and second collimator lenses 102 and 202 convert light fluxes LA and LB (first and second light fluxes) exited from the first and second light sources 101 and 201 into parallel light fluxes. Here, the parallel light fluxes include not only strictly parallel light fluxes but also substantially parallel light fluxes such as weak divergent light fluxes and weak convergent light fluxes.

Each of the first and second cylindrical lenses 103 and 203 has a finite power (a refractive power) in a sub-scanning section. The light fluxes LA and LB passed through the first and second collimator lenses 102 and 202 are condensed in the sub-scanning direction with the first and second cylindrical lenses 103 and 203.

The first and second aperture stops 104 and 204 control light flux diameters of the light fluxes LA and LB passed through the first and second cylindrical lenses 103 and 203.

Thus, the light fluxes LA and LB exited from the first and second light sources 101 and 201 are condensed only in the sub-scanning direction in the vicinity of a deflecting surface 105 of the first deflecting unit 1 and in the vicinity of a deflecting surface 205 of the second deflecting unit 2, respectively, and are formed into linear images each being long in the main scanning direction.

The first and second deflecting units 1 and 2 are each rotated in a direction of an arrow A in FIG. 1A or FIG. 1B by a not-illustrated drive unit such as a motor, thus deflecting the light fluxes LA and LB incident on the first and second deflecting units 1 and 2, respectively. Here, the first and second deflecting units 1 and 2 are each formed from a polygon mirror, for example.

Each of the first fθ lens 106 and the second fθ lens 107 is an anamorphic imaging lens having different powers in the main scanning section and in the sub-scanning section, which is configured to condense (guide) the light flux LA deflected by the deflecting surface 105 of the first deflecting unit 1 onto a first scanned surface 108.

Each of the first fθ lens 206 and the second fθ lens 207 is an anamorphic imaging lens having different powers in the main scanning section and in the sub-scanning section, which is configured to condense (guide) the light flux LB deflected by the deflecting surface 205 of the second deflecting unit 2 onto a second scanned surface 208.

In the optical scanning apparatus 10 of this embodiment, a first incident optical system 75a is formed from the first collimator lens 102, the first cylindrical lens 103, and the first aperture stop 104. Moreover, a second incident optical system 75b is formed from the second collimator lens 202, the second cylindrical lens 203, and the second aperture stop 204.

In the meantime, in the optical scanning apparatus 10 of this embodiment, a first imaging optical system 85a is formed from the first fθ lens 106 and the second fθ lens 107. Moreover, a second imaging optical system 85b is formed from the first fθ lens 206 and the second fθ lens 207.

Here, a refractive power of each of the second fθ lenses 107 and 207 in the sub-scanning section (including the optical axis) is larger than a refractive power of corresponding one of the first fθ lenses 106 and 206 in the sub-scanning section (including the optical axis), or in other words, is the largest of each of the first and second imaging optical systems 85a and 85b.

The light flux LA emitted from a light emitting point of the first light source 101 is converted into the parallel light flux by the first collimator lens 102.

Then, the converted light flux LA is condensed in the sub-scanning direction by the first cylindrical lens 103, passed through the first aperture stop 104, and incident on the deflecting surface 105 of the first deflecting unit 1.

The light flux LA emitted from the first light source 101 and incident on the deflecting surface 105 of the first deflecting unit 1 is subjected to deflection scanning by the first deflecting unit 1 and is then condensed on the first scanned surface 108 by the first imaging optical system 85a, thus scanning the first scanned surface 108 at a uniform velocity.

The light flux LB emitted from a light emitting point of the second light source 201 is converted into the parallel light flux by the second collimator lens 202.

Then, the converted light flux LB is condensed in the sub-scanning direction by the second cylindrical lens 203, passed through the second aperture stop 204, and incident on the deflecting surface 205 of the second deflecting unit 2.

The light flux LB emitted from the second light source 201 and incident on the deflecting surface 205 of the second deflecting unit 2 is subjected to deflection scanning by the second deflecting unit 2 and is then condensed on the second scanned surface 208 by the second imaging optical system 85*b*, thus scanning the second scanned surface 208 at a uniform velocity.

In the optical scanning apparatus 10 of this embodiment, the light fluxes LA and LB are incident perpendicularly on the deflecting surfaces 105 and 205 of the first and second deflecting units 1 and 2 in the sub-scanning section. However, the present invention is not limited to the foregoing and the light fluxes LA and LB may be incident on at a certain angle.

Here, the first and second deflecting units 1 and 2 are rotated in the direction A in FIGS. 1A and 1B. Accordingly, the light fluxes LA and LB subjected to the deflection scanning scan the first and second scanned surfaces 108 and 208 in a direction B in FIGS. 1A and 1B.

Meanwhile, reference numerals C0 and D0 denote deflection points (axial deflection points) on the deflecting surfaces 105 and 205 of the first and second deflecting units 1 and 2 relative to a principal ray of an axial flux. In the meantime, the deflection points C0 and D0 serve as reference points of the first and second imaging optical systems 85*a* and 85*b*.

Note that first and second photosensitive drums 108 and 208 are used as the first and second scanned surfaces 108 and 208 in this embodiment.

Meanwhile, exposure distribution in the sub-scanning direction on the first and second photosensitive drums 108 and 208 is formed by rotating the first and second photosensitive drums 108 and 208 in the sub-scanning direction in each session of main scanning exposure.

Next, characteristics of the first and second incident optical systems 75*a* and 75*b* and the first and second imaging optical systems 85*a* and 85*b* of the optical scanning apparatus 10 of this embodiment will be listed in the following Tables 1 to 3.

TABLE 1

| characteristics of light sources 101 and 102 | | |
| --- | --- | --- |
| number of light emitting points | N (points) | 2 |
| rotation angles of light sources 101 and 102 | (deg) | −6.54 |
| array | (dimensions) | 1 |
| pitch | pitch (mm) | 0.09 |
| wavelength | λ (nm) | 790 |
| incident polarization to deflecting surfaces 105 and 205 | | p polarization |
| full angle at half maximum in main scanning direction | FFPy (deg) | 12.00 |
| full angle at half maximum in sub-scanning direction | FFPz (deg) | 30.00 |

| forms of stops | | | |
| --- | --- | --- | --- |
| | | main scanning direction | sub-scanning direction |
| aperture stops 104 and 204 | | 2.340 | 0.624 |

| refractive indices | | | |
| --- | --- | --- | --- |
| collimator lenses 102 and 202 | N1 | 1.762 | |
| cylindrical lenses 103 and 203 | N2 | 1.524 | |

| forms of optical elements | | | |
| --- | --- | --- | --- |
| | | main scanning direction | sub-scanning direction |
| curvature radius of incident surfaces of collimator lenses 102 and 202 | r1a (mm) | ∞ | ∞ |
| curvature radius of exit surfaces of collimator lenses 102 and 202 | r1b (mm) | −15.216 | −15.216 |
| curvature radius of incident surfaces of cylindrical lenses 103 and 203 | r2a (mm) | ∞ | 41.028 |
| curvature radius of exit surfaces of cylindrical lenses 103 and 203 | r2b (mm) | ∞ | ∞ |

| focal lengths | | | |
| --- | --- | --- | --- |
| | | main scanning direction | sub-scanning direction |
| collimator lenses 102 and 202 | fcol (mm) | 19.98 | 19.98 |
| cylindrical lenses 103 and 203 | fcyl (mm) | ∞ | 78.30 |

| arrangement | | |
| --- | --- | --- |
| light sources 101 and 201 to collimator lenses 102 and 202 | d0 (mm) | 18.33 |
| incident surfaces of collimator lenses 102 and 202 to exit surfaces of collimator lenses 102 and 202 | d1 (mm) | 3.00 |

TABLE 1-continued

| | | |
|---|---|---|
| exit surfaces of collimator lenses 102 and 202 to incident surfaces of cylindrical lenses 103 and 203 | d2 (mm) | 19.92 |
| Incident surfaces of cylindrical lenses 103 and 203 to exit surfaces of cylindrical lenses 103 and 203 | d3 (mm) | 3.00 |
| exit surfaces of cylindrical lenses 103 and 203 to aperture stops 104 and 204 | d4 (mm) | 36.67 |
| aperture stops 104 and 204 to deflection points C0 and D0 | d5 (mm) | 40.33 |
| Incident angle in main scanning section of light exited from aperture stop 104 into deflecting surface 105 | A1 (deg) | 90.00 |
| incident angle in main scanning section of exited light from aperture stop 204 into deflecting surface 205 | A2 (deg) | 90.00 |
| incident angle in sub-scanning section of exited light from aperture stop 104 into deflecting surface 105 | A3 (deg) | 0.00 |
| incident angle in sub-scanning section of exited light from aperture stop 204 into deflecting surface 205 | A4 (deg) | 0.00 |

TABLE 2

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of first fθ lens 106 | N5 | 1.528 |
| refractive index of second fθ lens 107 | N6 | 1.528 |
| deflecting unit | | |
| number of deflecting surfaces | | 4 |
| circumradius | Rpol (mm) | 10 |
| rotation center to deflection point C0 (optical axis direction) | Xpol (mm) | 5.74 |
| rotation center to deflection point C0 (main scanning direction) | Ypol (mm) | 4.26 |
| scanning optical system and arrangement | | |
| deflection point C0 to incident surface of first fθ lens 106 | d12 (mm) | 17.00 |
| incident surface of first fθ lens 106 to exit surface of first fθ lens 106 | d13 (mm) | 6.70 |
| exit surface of first fθ lens 106 to incident surface of second fθ lens 107 | d14 (mm) | 58.33 |
| incident surface of second fθ lens 107 to exit surface of second fθ lens 107 | d15 (mm) | 4.00 |
| exit surface of second fθ lens 107 to first scanned surface 108 | d16 (mm) | 81.97 |
| deflection point C0 to incident surface of second fθ lens 107 | L1 (mm) | 82.03 |
| deflection point C0 to first scanned surface 108 | T1 (mm) | 168.00 |
| amount of sub-scanning eccentricity of second fθ lens 107 | shiftZ (mm) | 0.00 |
| sub-scanning magnification of first scanning optical system 85a | β | 1.00 |

| shape of meridional line of first fθ lens 106 | | |
|---|---|---|
| | incident surface counter-light source side | exit surface counter-light source side |
| R | −98.419 | −45.741 |
| ku | 1.437E+01 | 5.704E+05 |
| B4u | −3.438E−06 | −8.454E−06 |
| B6u | 2.338E−08 | 7.905E−09 |

TABLE 2-continued

| | | |
|---|---|---|
| B8u | −4.759E−11 | −3.225E−12 |
| B10u | 3.548E−14 | −1.323E−14 |
| B12u | 0 | 0 |

| | light source side | light source side |
|---|---|---|
| kl | 1.437E+01 | 5.704E+05 |
| B4l | −3.438E−06 | −8.490E−06 |
| B6l | 2.338E−08 | 7.211E−09 |
| B8l | −4.759E−11 | −1.001E−12 |
| B10l | 3.548E−14 | −1.538E−14 |
| B12l | 0 | 0 |

| shape of sagittal line of first fθ lens 106 | | |
|---|---|---|
| | incident surface change in sagittal radius | exit surface change in sagittal radius |
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 2-continued shape of meridional line of second fθ lens 107

| | incident surface counter-light source side | exit surface counter-light source side |
|---|---|---|
| R | −10000 | 419.706 |
| ku | 0 | −1.568E+02 |
| B4u | 0 | −3.642E−07 |
| B6u | 0 | 5.304E−11 |
| B8u | 0 | −6.573E−15 |
| B10u | 0 | 5.385E−19 |
| B12u | 0 | −2.106E−23 |

| | light source side | light source side |
|---|---|---|
| kl | 0 | −1.568E+02 |
| B4l | 0 | −3.694E−07 |
| B6l | 0 | 6.039E−11 |
| B8l | 0 | −9.218E−15 |
| B10l | 0 | 9.578E−19 |
| B12l | 0 | −4.632E−23 | shape of sagittal line of second fθ lens 107

| | incident surface change in sagittal radius | exit surface change in sagittal radius |
|---|---|---|
| r | 100.000 | −27.247 |
| E1 | 0 | 1.637E−04 |
| E2 | 0 | 1.678E−04 |
| E3 | 0 | 0 |
| E4 | 0 | −2.909E−08 |
| E5 | 0 | 0 |
| E6 | 0 | 4.660E−12 |
| E7 | 0 | 0 |
| E8 | 0 | −3.388E−16 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 3 fθ coefficient, scanning width, and angle of view

| fθ coefficient | k (mm/rad) | 146 |
|---|---|---|
| scanning width | W (mm) | 230 |
| maximum angle of view | θ (deg) | 45.1 | refractive indices

| refractive index of first fθ lens 206 | N5 | 1.528 |
|---|---|---|
| refractive index of second fθ lens 207 | N6 | 1.528 | deflecting unit

| number of deflecting surfaces | | 4 |
|---|---|---|
| circumradius | Rpol (mm) | 10 |
| rotation center to deflection point D0 (optical axis direction) | Xpol (mm) | 5.74 |
| rotation center to deflection point D0 (main scanning direction) | Ypol (mm) | 4.26 |

TABLE 3-continued scanning optical system and arrangement

| deflection point D0 to incident surface of first fθ lens 206 | d12 (mm) | 17.00 |
|---|---|---|
| incident surface of first fθ lens 206 to exit surface of first fθ lens 206 | d13 (mm) | 6.70 |
| exit surface of first fθ lens 206 to incident surface of second fθ lens 207 | d14 (mm) | 60.04 |
| incident surface of second fθ lens 207 to exit surface of second fθ lens 207 | d15 (mm) | 4.00 |
| exit surface of second fθ lens 207 to second scanned surface 208 | d16 (mm) | 80.26 |
| deflection point D0 to incident surface of second fθ lens 207 | L1 (mm) | 83.74 |
| deflection point D0 to second scanned surface 208 | T1 (mm) | 168.00 |
| amount of sub-scanning eccentricity of second fθ lens 207 | shiftZ (mm) | 0.00 |
| sub-scanning magnification of second scanning optical system 85b | β | 1.00 | shape of meridional line of first fθ lens 206

| | incident surface counter-light source side | exit surface counter-light source side |
|---|---|---|
| R | −96.960 | −45.544 |
| ku | 1.523E+01 | 4.168E+05 |
| B4u | −4.379E−06 | −9.055E−06 |
| B6u | 2.280E−08 | 6.363E−09 |
| B8u | −4.736E−11 | −3.697E−12 |
| B10u | 4.151E−14 | −1.229E−14 |
| B12u | 0 | 0 |

| | light source side | light source side |
|---|---|---|
| kl | 1.523E+01 | 4.168E+05 |
| B4l | −4.379E−06 | −9.125E−06 |
| B6l | 2.280E−08 | 5.745E−09 |
| B8l | −4.736E−11 | −1.479E−12 |
| B10l | 4.151E−14 | −1.438E−14 |
| B12l | 0 | 0 | shape of sagittal line of first fθ lens 206

| | incident surface change in sagittal radius | exit surface change in sagittal radius |
|---|---|---|
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 3-continued shape of meridional line of second fθ lens 207

| | incident surface counter-light source side | exit surface counter-light source side |
|---|---|---|
| R | −10000 | 419.738 |
| ku | 0 | −1.476E+02 |
| B4u | 0 | −3.473E−07 |
| B6u | 0 | 5.136E−11 |
| B8u | 0 | −6.880E−15 |
| B10u | 0 | 6.274E−19 |
| B12u | 0 | −2.763E−23 |
| | light source side | light source side |
| kl | 0 | −1.476E+02 |
| B4l | 0 | −3.489E−07 |
| B6l | 0 | 5.663E−11 |
| B8l | 0 | −8.877E−15 |
| B10l | 0 | 9.376E−19 |
| B12l | 0 | −4.570E−23 | shape of sagittal line of second fθ lens 207

| | incident surface change in sagittal radius | exit surface change in sagittal radius |
|---|---|---|
| r | 25.000 | −152.472 |
| E1 | 0.000152781 | −6.466E−04 |
| E2 | 8.723E−05 | 2.766E−04 |
| E3 | 0 | 0 |
| E4 | −4.869E−10 | −4.072E−08 |
| E5 | 0 | 0 |
| E6 | −2.672E−12 | 1.928E−11 |
| E7 | 0 | 0 |
| E8 | 3.426E−16 | 2.849E−16 |
| E9 | 0 | 0 |
| E10 | 0 | 0 |
| | sagittal tilt | sagittal tilt |
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

Note that in Tables 1 to 3, a direction of an optical axis, an axis orthogonal to the optical axis in the main scanning section, and an axis orthogonal to the optical axis in the sub-scanning section in the case where an intersection point of each lens surface and the optical axis is determined as a point of origin are defined as an x axis, a y axis, and a z axis, respectively. In addition, in Tables 2 and 3, an expression "E-x" means "×10$^{-x}$".

An aspheric surface shape (a meridional shape) in the main scanning section of each of lens surfaces of the first fθ lenses 106 and 206 and the second fθ lenses 107 and 207 of the optical scanning apparatus 10 of this embodiment is defined by the following expression (1):

$$x = \frac{y^2/R}{1 + (1-(1+k)(y/R)^2)^{1/2}} + \sum_{i=4}^{12} B_i y^i, \quad (1)$$

where R is a curvature radius, k is an eccentricity, and $B_i$ (i=4, 6, 8, 10, 12) is an aspheric coefficient. Here, if the coefficients $B_i$ on a positive side and a negative side vary concerning y, then an index u is added to the coefficient on the positive side (namely, $B_{iu}$) while an index 1 is added to the coefficient on the negative side (namely, $B_{il}$).

Meanwhile, an aspheric surface shape (a sagittal shape) in the sub-scanning section of each of the lens surfaces of the first fθ lenses 106 and 206 and the second fθ lenses 107 and 207 is defined by the following expression (2):

$$S = \frac{z^2/r'}{1 + (1-(z/r')^2)^{1/2}} + \sum_{j=0}^{12} \sum_{k=1}^{1} M_{jk} Y^j Z^k, \quad (2)$$

where $M_{jk}$ (j=0 to 12, and k=1) is an aspheric coefficient.

In the meantime, a curvature radius r' in the sub-scanning section continuously varies in accordance with the y coordinate of the lens surface as defined in the following expression (3):

$$r' = r\left(1 + \sum_{j=1}^{10} E_j y^j\right), \quad (3)$$

where r is a curvature radius on the optical axis and $E_j$ (j=1 to 10) is a coefficient of variation.

Next, effects of the optical scanning apparatus 10 of this embodiment will be described.

Figure 2:
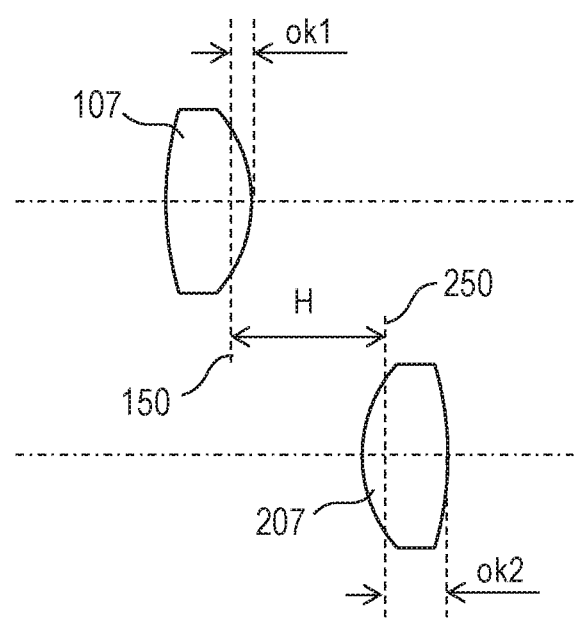
FIG. 2 is a view showing principal plane positions of second fθ lenses included in the optical scanning apparatus according to the first embodiment.

FIG. 2 shows principal plane positions of the second fθ lenses 107 and 207 included in the optical scanning apparatus 10 of this embodiment.

As shown in FIG. 2, the second fθ lenses 107 and 207 include image-side principal planes 150 and 250, respectively.

Moreover, the image-side principal planes 150 and 250 are located away by distances $ok_1$ and $ok_2$ from positions of passage of the axial rays on exit surfaces of the second fθ lenses 107 and 207, respectively.

In the meantime, image-side principal plane 150 is located away by a distance H from the image-side principal plane 250.

Here, assuming that a refractive index, a center thickness (a lens thickness or a thickness on the optical axis), and a refractive power of the second fθ lens 107 are defined as $N_1$, $d_1$, and $\phi_1$, respectively, and that a refractive power of the incident surface of the second fθ lens 107 is defined as $\phi_{11}$, the distance $ok_1$ is obtained from the following expression (4):

$$ok_1 = -\frac{d_1}{N_1}\frac{\phi_{11}}{\phi_1}. \quad (4)$$

Likewise, assuming that a refractive index, a center thickness, and a refractive power of the second fθ lens 207 are defined as $N_2$, $d_2$, and $\phi_2$, respectively, and that a refractive power of the incident surface of the second fθ lens 207 is defined as $\phi_{21}$, the distance $ok_2$ is obtained from the following expression (5):

$$ok_2 = -\frac{d_2}{N_2}\frac{\phi_{21}}{\phi_2}. \quad (5)$$

In the optical scanning apparatus 10 of this embodiment, the values of $ok_1$ and $ok_2$ turn out to be −0.497 mm and −1.987 mm, respectively.

Accordingly, the optical scanning apparatus 10 of this embodiment satisfies a condition defined as $ok_2 < ok_1$.

As a consequence, even when a distance on an optical path from the deflection point C0 to the incident surface of the second fθ lens 107 is different from a distance on an optical path from the deflection point D0 to the incident surface of the second fθ lens 207, it is possible to bring the image-side principal planes 150 and 250 close to each other (in other words, to reduce the distance H or to reduce a difference between the distance on the optical path from the deflection point C0 to the image-side principal plane 150 and the distance on the optical path from the deflection point D0 to the image-side principal plane 250).

Moreover, in order to reduce the size of the apparatus, it is preferable to equalize ratios of the refractive index to the center thickness between the second fθ lenses 107 and 207.

Accordingly, it is more preferable that the optical scanning apparatus 10 of this embodiment satisfy the following expression (6):

$$\frac{\phi_{11}}{\phi_1} < \frac{\phi_{21}}{\phi_2}. \tag{6}$$

In the optical scanning apparatus 10 of this embodiment, the values of $\phi_{11}$ and $\phi_1$ turn out to be 0.0052 and 0.0242, respectively, while the values of $\phi_{21}$ and $\phi_2$ turn out to be 0.0210 and 0.0242, respectively. Thus, the expression (6) is satisfied.

As a consequence, in the optical scanning apparatus 10 of this embodiment, both of magnifications in the sub-scanning direction of the first and second imaging optical systems 85a and 85b can be adjusted to −1.0 and a difference therebetween is substantially equal to 0.

Hence, it is possible to reduce a difference between Fno values of the first and second imaging optical systems 85a and 85b by reducing the difference in sub-scanning magnification between the first and second imaging optical systems 85a and 85b.

In this way, it is possible to reduce a difference in amount of light between irradiating light beams that irradiate the first and second scanned surfaces 108 and 208, respectively.

Meanwhile, when curvature radii in the sub-scanning section including the optical axis of the incident surface and the exit surface of the second fθ lens 107 are defined as $R_{11}$ and $R_{12}$, respectively, values $|R_{11}|$ and $|R_{12}|$ turn out to be 100 and 27.25 in the optical scanning apparatus 10 of this embodiment.

In the meantime, when curvature radii in the sub-scanning section including the optical axis of the incident surface and the exit surface of the second fθ lens 207 are defined as $R_{21}$ and $R_{22}$, respectively, values of $|R_{21}|$ and $|R_{22}|$ turn out to be 25 and 152.47 in the optical scanning apparatus 10 of this embodiment.

The optical scanning apparatus 10 of this embodiment satisfies relations of $|R_{11}| > |R_{12}|$ and $|R_{21}| < |R_{22}|$, which represent a desirable configuration for increasing the distance between the second fθ lenses 107 and 207, or in other words, for locating the second fθ lenses 107 and 207 away from each other.

Thus, in the optical scanning apparatus 10 of this embodiment, the second fθ lenses 107 and 207 are configured as described above. Accordingly, it is possible to provide the optical scanning apparatus being small in size while reducing the difference in amount of light between the first and second scanned surfaces 108 and 208, namely, between colors.

Second Embodiment

Figure 3:
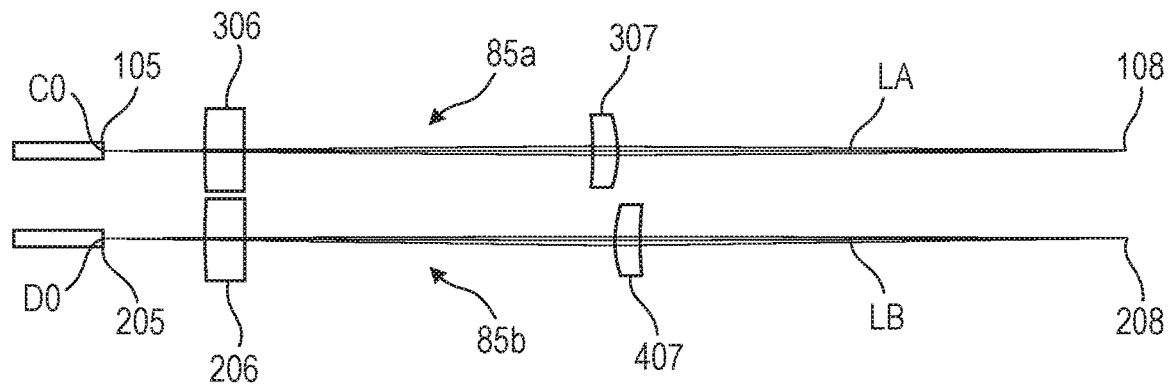
FIG. 3 is a development view in a sub-scanning section of imaging optical systems included in an optical scanning apparatus according to a second embodiment.

FIG. 3 shows a development view in the sub-scanning section of the first and second imaging optical systems 85a and 85b included in an optical scanning apparatus according to a second embodiment.

Note that the optical scanning apparatus of this embodiment has the same configuration as the optical scanning apparatus 10 according to the first embodiment except that first fθ lenses 306 and 406 and second fθ lenses 307 and 407 are used instead of the first fθ lenses 106 and 206 and the second fθ lenses 107 and 207. For this reason, the same components will be denoted by the same reference numerals and explanations thereof will be omitted.

Characteristics of the first fθ lenses 306 and 406 and of the second fθ lenses 307 and 407 of the optical scanning apparatus of this embodiment will be listed in the following Tables 4 and 5.

TABLE 4

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of first fθ lens 306 | N5 | 1.528 |
| refractive index of second fθ lens 307 | N6 | 1.528 |
| deflecting unit | | |
| number of deflecting surfaces | | 4 |
| circumradius | Rpol (mm) | 10 |
| rotation center to deflection point C0 (optical axis direction) | Xpol (mm) | 5.74 |
| rotation center to deflection point C0 (main scanning direction) | Ypol (mm) | 4.26 |
| scanning optical system and arrangement | | |
| deflection point C0 to incident surface of first fθ lens 306 | d12 (mm) | 17.00 |
| incident surface of first fθ lens 306 to exit surface of first fθ lens 306 | d13 (mm) | 6.70 |
| exit surface of first fθ lens 306 to incident surface of second fθ lens 307 | d14 (mm) | 57.24 |
| incident surface of second fθ lens 307 to exit surface of second fθ lens 307 | d15 (mm) | 4.00 |
| exit surface of second fθ lens 307 to first scanned surface 108 | d16 (mm) | 83.06 |
| deflection point C0 to incident surface of second fθ lens 307 | L1 (mm) | 80.94 |
| deflection point C0 to first scanned surface 108 | T1 (mm) | 168.00 |
| amount of sub-scanning eccentricity of second fθ lens 307 | shiftZ (mm) | 0.00 |
| sub-scanning magnification of first scanning optical system 85a | β | 1.00 |
| shape of meridional line of first fθ lens 306 | | |
| | incident surface counter-light source side | exit surface counter-light source side |
| R | −93.748 | −44.843 |
| ku | 1.366E+01 | 4.002E+05 |
| B4u | −3.866E−06 | −8.967E−06 |
| B6u | 2.346E−08 | 7.274E−09 |
| B8u | −4.766E−11 | −3.429E−12 |

TABLE 4-continued

| | light source side | light source side |
|---|---|---|
| B10u | 3.911E−14 | −1.274E−14 |
| B12u | 0 | 0 |
| kl | 1.366E+01 | 4.002E+05 |
| B4l | −3.866E−06 | −9.035E−06 |
| B6l | 2.346E−08 | 6.672E−09 |
| B8l | −4.766E−11 | −1.251E−12 |
| B10l | 3.911E−14 | −1.485E−14 |
| B12l | 0 | 0 | shape of sagittal line of first fθ lens 306

| | incident surface change in sagittal radius | exit surface change in sagittal radius |
|---|---|---|
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 307

| | incident surface counter-light source side | exit surface counter-light source side |
|---|---|---|
| R | −10000 | 406.972 |
| ku | 0 | −1.589E+02 |
| B4u | 0 | −3.666E−07 |
| B6u | 0 | 5.348E−11 |
| B8u | 0 | −6.686E−15 |
| B10u | 0 | 5.606E−19 |
| B12u | 0 | −2.306E−23 |

| | light source side | light source side |
|---|---|---|
| kl | 0 | −1.589E+02 |
| B4l | 0 | −3.681E−07 |
| B6l | 0 | 5.909E−11 |
| B8l | 0 | −8.967E−15 |
| B10l | 0 | 9.408E−19 |
| B12l | 0 | −4.673E−23 | shape of sagittal line of second fθ lens 307

| | incident surface change in sagittal radius | exit surface change in sagittal radius |
|---|---|---|
| r | −100.000 | −18.035 |
| E1 | −2.96115E−05 | 4.559E−05 |
| E2 | −7.99179E−05 | 1.156E−04 |
| E3 | 0 | 0 |
| E4 | −2.8478E−09 | −3.769E−08 |
| E5 | 0 | 0 |
| E6 | 2.24063E−12 | 5.337E−12 |
| E7 | 0 | 0 |
| E8 | −2.12102E−16 | −3.371E−16 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_10 | 0 | 0 |
| M10_1 | 0 | 0 |
| M11_1 | 0 | 0 |
| M12_1 | 0 | 0 |

TABLE 5 fθ coefficient, scanning width, and angle of view

| | | |
|---|---|---|
| fθ coefficient | k (mm/rad) | 146 |
| scanning width | W (mm) | 230 |
| maximum angle of view | θ (deg) | 45.1 | refractive indices

| | | |
|---|---|---|
| refractive index of first fθ lens 406 | N5 | 1.528 |
| refractive index of second fθ lens 407 | N6 | 1.528 | deflecting unit

| | | |
|---|---|---|
| number of deflecting surfaces | | 4 |
| circumradius | Rpol (mm) | 10 |
| rotation center to deflection point D0 (optical axis direction) | Xpol (mm) | 5.74 |
| rotation center to deflection point D0 (main scanning direction) | Ypol (mm) | 4.26 | scanning optical system and arrangement

| | | |
|---|---|---|
| deflection point D0 to incident surface of first fθ lens 406 | d12 (mm) | 17.00 |
| incident surface of first fθ lens 406 to exit surface of first fθ lens 406 | d13 (mm) | 6.70 |
| exit surface of first fθ lens 406 to incident surface of second fθ lens 407 | d14 (mm) | 60.95 |
| incident surface of second fθ lens 407 to exit surface of second fθ lens 407 | d15 (mm) | 4.00 |
| exit surface of second fθ lens 407 to second scanned surface 208 | d16 (mm) | 79.35 |
| deflection point D0 to incident surface of second fθ lens 407 | L1 (mm) | 84.65 |
| deflection point D0 to second scanned surface 208 | T1 (mm) | 168.00 |
| amount of sub-scanning eccentricity of second fθ lens 407 | shiftZ (mm) | 0.00 |
| sub-scanning magnification of second scanning optical system 85b | β | 1.00 | shape of meridional line of first fθ lens 406

| | incident surface counter-light source side | exit surface counter-light source side |
|---|---|---|
| R | −97.027 | −45.590 |
| ku | 1.512E+01 | 3.744E+05 |
| B4u | −4.545E−06 | −9.102E−06 |
| B6u | 2.275E−08 | 6.191E−09 |
| B8u | −4.746E−11 | −3.783E−12 |
| B10u | 4.165E−14 | −1.215E−14 |
| B12u | 0 | 0 |

TABLE 5-continued

|  | light source side | light source side |
|---|---|---|
| kl | 1.512E+01 | 3.744E+05 |
| B4l | −4.545E−06 | −9.170E−06 |
| B6l | 2.275E−08 | 5.615E−09 |
| B8l | −4.746E−11 | −1.747E−12 |
| B10l | 4.165E−14 | −1.399E−14 |
| B12l | 0 | 0 | shape of sagittal line of first fθ lens 406

|  | incident surface change in sagittal radius | exit surface change in sagittal radius |
|---|---|---|
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |

|  | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 407

|  | incident surface counter-light source side | exit surface counter-light source side |
|---|---|---|
| R | −10000 | 421.357 |
| ku | 0 | −1.402E+02 |
| B4u | 0 | −3.433E−07 |
| B6u | 0 | 5.102E−11 |
| B8u | 0 | −6.901E−15 |
| B10u | 0 | 6.285E−19 |
| B12u | 0 | −2.731E−23 |

|  | light source side | light source side |
|---|---|---|
| kl | 0 | −1.402E+02 |
| B4l | 0 | −3.457E−07 |
| B6l | 0 | 5.649E−11 |
| B8l | 0 | −8.915E−15 |
| B10l | 0 | 9.374E−19 |
| B12l | 0 | −4.514E−23 | shape of sagittal line of second fθ lens 407

|  | incident surface change in sagittal radius | exit surface change in sagittal radius |
|---|---|---|
| r | 18.000 | 98.828 |
| E1 | 7.95347E−05 | −8.321E−05 |
| E2 | 1.177E−04 | 1.117E−04 |
| E3 | 0 | 0 |
| E4 | −1.686E−09 | 3.871E−08 |
| E5 | 0 | 0 |
| E6 | −3.947E−12 | −2.937E−11 |
| E7 | 0 | 0 |
| E8 | 4.016E−16 | 3.231E−15 |
| E9 | 0 | 0 |
| E10 | 0 | 0 |

|  | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

Note that in Tables 4 and 5, the direction of the optical axis, the axis orthogonal to the optical axis in the main scanning section, and the axis orthogonal to the optical axis in the sub-scanning section in the case where the intersection point of each lens surface and the optical axis is determined as the point of origin are defined as the x axis, the y axis, and the z axis, respectively. In addition, in Tables 4 and 5, the expression "E-x" means "×10⁻ˣ".

The aspheric surface shape (the meridional shape) in the main scanning section of each of the lens surfaces of the first fθ lenses 306 and 406 and the second fθ lenses 307 and 407 of the optical scanning apparatus of this embodiment is defined by the above-described expression (1).

Meanwhile, the aspheric surface shape (the sagittal shape) in the sub-scanning section of each of the lens surfaces of the first fθ lenses 306 and 406 and the second fθ lenses 307 and 407 is defined by the above-described expression (2).

In the meantime, the curvature radius r' in the sub-scanning section continuously varies in accordance with the y coordinate of the lens surface as defined in the above-described expression (3).

In the optical scanning apparatus of this embodiment, the values of $ok_1$ and $ok_2$ turn out to be 0.498 mm and −2.767 mm, respectively, in accordance with the above-described expressions (4) and (5).

Accordingly, the optical scanning apparatus of this embodiment satisfies $ok_2 < ok_1$.

As a consequence, even when the distance on an optical path from the deflection point C0 to the incident surface of the second fθ lens 307 is different from the distance on an optical path from the deflection point D0 to the incident surface of the second fθ lens 407, it is possible to bring the image-side principal planes 150 and 250 close to each other (in other words, to reduce the difference between the distance on the optical path from the deflection point C0 to the image-side principal plane 150 and the distance on the optical path from the deflection point D0 to the image-side principal plane 250).

Meanwhile, in the optical scanning apparatus of this embodiment, the values of $\phi_1$ and $\phi_1$ turn out to be −0.0052 and 0.0242, respectively, while the values of $\phi_{21}$ and $\phi_2$ turn out to be 0.0291 and 0.0242, respectively. Thus, the expression (6) is satisfied.

As a consequence, in the optical scanning apparatus of this embodiment, both of magnifications in the sub-scanning direction of the first and second imaging optical systems 85a and 85b can be adjusted to −1.0 and the difference therebetween is substantially equal to 0.

Hence, it is possible to reduce the difference between the Fno values of the first and second imaging optical systems 85a and 85b by reducing the difference in sub-scanning magnification between the first and second imaging optical systems 85a and 85b.

In this way, it is possible to reduce the difference in amount of light between the irradiating light beams that irradiate the first and second scanned surfaces 108 and 208, respectively.

Meanwhile, in the optical scanning apparatus of this embodiment, the absolute values of $|R_{11}|$ and $|R_{12}|$ of the curvature radii in the sub-scanning section including the optical axis of the incident surface and the exit surface of the second fθ lens 307 turn out to be 100 and 18.04, respectively.

In the meantime, the absolute values of $|R_{21}|$ and $|R_{22}|$ of the curvature radii in the sub-scanning section including the optical axis of the incident surface and the exit surface of the second fθ lens 407 turn out to be 18 and 98.83 respectively.

The optical scanning apparatus of this embodiment satisfies the relations of $|R_{11}|>|R_{12}|$ and $|R_{21}|<|R_{22}|$, which represent a desirable configuration for increasing the distance between the second fθ lenses 307 and 407, or in other words, for locating the second fθ lenses 307 and 407 away from each other.

Thus, in the optical scanning apparatus of this embodiment, the second fθ lenses 307 and 407 are configured as described above. Accordingly, it is possible to provide the optical scanning apparatus being small in size while reducing the difference in amount of light between the first and second scanned surfaces 108 and 208, namely, between colors.

Third Embodiment

Figure 4:
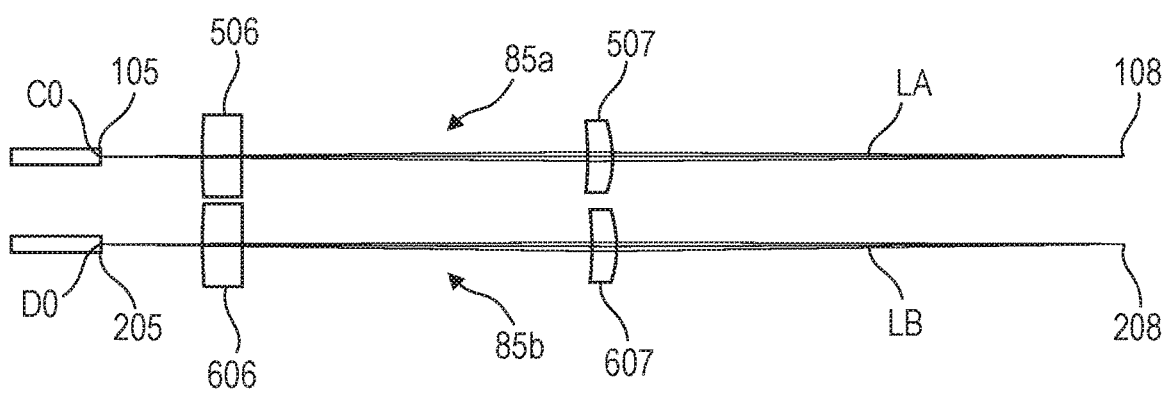
FIG. 4 is a development view in a sub-scanning section of imaging optical systems included in an optical scanning apparatus according to a third embodiment.

FIG. 4 shows a development view in the sub-scanning section of the first and second imaging optical systems 85a and 85b included in an optical scanning apparatus according to a third embodiment.

Note that the optical scanning apparatus of this embodiment has the same configuration as the optical scanning apparatus 10 according to the first embodiment except that first fθ lenses 506 and 606 and second fθ lenses 507 and 607 are used instead of the first fθ lenses 106 and 206 and the second fθ lenses 107 and 207. For this reason, the same components will be denoted by the same reference numerals and explanations thereof will be omitted.

Characteristics of the first fθ lenses 506 and 606 and of the second fθ lenses 507 and 607 of the optical scanning apparatus of this embodiment will be listed in the following Tables 6 and 7.

TABLE 6

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of first fθ lens 506 | N5 | 1.528 |
| refractive index of second fθ lens 507 | N6 | 1.528 |
| deflecting unit | | |
| number of deflecting surfaces | | 4 |
| circumradius | Rpol (mm) | 10 |
| rotation center to deflection point C0 (optical axis direction) | Xpol (mm) | 5.74 |
| rotation center to deflection point C0 (main scanning direction) | Ypol (mm) | 4.26 |

TABLE 6-continued

| scanning optical system and arrangement | | |
|---|---|---|
| deflection point C0 to incident surface of first fθ lens 506 | d12 (mm) | 17.00 |
| incident surface of first fθ lens 506 to exit surface of first fθ lens 506 | d13 (mm) | 6.70 |
| exit surface of first fθ lens 506 to incident surface of second fθ lens 507 | d14 (mm) | 56.25 |
| incident surface of second fθ lens 507 to exit surface of second fθ lens 507 | d15 (mm) | 4.00 |
| exit surface of second fθ lens 507 to first scanned surface 108 | d16 (mm) | 84.05 |
| deflection point C0 to incident surface of second fθ lens 507 | L1 (mm) | 79.95 |
| deflection point C0 to first scanned surface 108 | T1 (mm) | 168.00 |
| amount of sub-scanning eccentricity of second fθ lens 507 | shiftZ (mm) | 0.00 |
| sub-scanning magnification of first scanning optical system 85a | β | 1.00 |

| shape of meridional line of first fθ lens 506 | | |
|---|---|---|
| | incident surface counter-light source | exit surface counter-light source side |
| R | −96.915 | −44.388 |
| ku | 1.527E+01 | 3.911E+04 |
| B4u | −6.979E−06 | −8.783E−06 |
| B6u | 2.719E−08 | 4.091E−09 |
| B8u | −4.738E−11 | −4.890E−13 |
| B10u | 4.123E−14 | −1.047E−14 |
| B12u | 0 | 0 |
| | light source side | light source side |
| kl | 1.527E+01 | 3.911E+04 |
| B4l | −6.979E−06 | −8.863E−06 |
| B6l | 2.719E−08 | 3.472E−09 |
| B8l | −4.738E−11 | 1.879E−12 |
| B10l | 4.123E−14 | −1.257E−14 |
| B12l | 0 | 0 |

| shape of sagittal line of first fθ lens 506 | | |
|---|---|---|
| | incident surface change in sagittal radius | exit surface change in sagittal radius |
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |
| | sagittal tilt | sagittal tilt |
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 6-continued shape of meridional line of second fθ lens 507

| | incident surface counter-light source side | exit surface counter-light source side |
|---|---|---|
| R | −10000 | 412.606 |
| ku | 0 | −1.521E+02 |
| B4u | 0 | −3.725E−07 |
| B6u | 0 | 5.831E−11 |
| B8u | 0 | −8.332E−15 |
| B10u | 0 | 8.105E−19 |
| B12u | 0 | −3.814E−23 |

| | light source side | light source side |
|---|---|---|
| kl | 0 | −1.521E+02 |
| B4l | 0 | −3.714E−07 |
| B6l | 0 | 6.158E−11 |
| B8l | 0 | −9.758E−15 |
| B10l | 0 | 1.036E−18 |
| B12l | 0 | −5.123E−23 | shape of sagittal line of second fθ lens 507

| | incident surface change in sagittal radius | exit surface change in sagittal radius |
|---|---|---|
| r | −35.000 | −13.894 |
| E1 | 6.74534E−05 | 7.430E−05 |
| E2 | −2.2938E−06 | 1.166E−04 |
| E3 | 0 | 0 |
| E4 | −3.29173E−08 | −5.040E−08 |
| E5 | 0 | 0 |
| E6 | 1.08294E−11 | 9.171E−12 |
| E7 | 0 | 0 |
| E8 | −1.05847E−15 | −6.901E−16 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 7 fθ coefficient, scanning width, and angle of view

| fθ coefficient | k (mm/rad) | 146 |
|---|---|---|
| scanning width | W (mm) | 230 |
| maximum angle of view | θ (deg) | 45.1 | refractive indices

| refractive index of first fθ lens 606 | N5 | 1.528 |
|---|---|---|
| refractive index of second fθ lens 607 | N6 | 1.528 | deflecting unit

| number of deflecting surfaces | | 4 |
|---|---|---|
| circumradius | Rpol (mm) | 10 |
| rotation center to deflection point D0 (optical axis direction) | Xpol (mm) | 5.74 |
| rotation center to deflection point D0 (main scanning direction) | Ypol (mm) | 4.26 |

TABLE 7-continued scanning optical system and arrangement

| deflection point D0 to incident surface of first fθ lens 606 | d12 (mm) | 17.00 |
|---|---|---|
| incident surface of first fθ lens 606 to exit surface of first fθ lens 606 | d13 (mm) | 6.70 |
| exit surface of first fθ lens 606 to incident surface of second fθ lens 607 | d14 (mm) | 57.24 |
| incident surface of second fθ lens 607 to exit surface of second fθ lens 607 | d15 (mm) | 4.00 |
| exit surface of second fθ lens 607 to second scanned surface 208 | d16 (mm) | 83.06 |
| deflection point D0 to incident surface of second fθ lens 607 | L1 (mm) | 80.94 |
| deflection point D0 to second scanned surface 208 | T1 (mm) | 168.00 |
| amount of sub-scanning eccentricity of second fθ lens 607 | shiftZ (mm) | 0.00 |
| sub-scanning magnification of second scanning optical system 85b | β | 1.00 | shape of meridional line of first fθ lens 606

| | incident surface counter-light source side | exit surface counter-light source side |
|---|---|---|
| R | −93.748 | −44.843 |
| ku | 1.366E+01 | 4.002E+05 |
| B4u | −3.866E−06 | −8.967E−06 |
| B6u | 2.346E−08 | 7.274E−09 |
| B8u | −4.766E−11 | −3.429E−12 |
| B10u | 3.911E−14 | −1.274E−14 |
| B12u | 0 | 0 |

| | light source side | light source side |
|---|---|---|
| kl | 1.366E+01 | 4.002E+05 |
| B4l | −3.866E−06 | −9.035E−06 |
| B6l | 2.346E−08 | 6.672E−09 |
| B8l | −4.766E−11 | −1.251E−12 |
| B10l | 3.911E−14 | −1.485E−14 |
| B12l | 0 | 0 | shape of sagittal line of first fθ lens 606

| | incident surface change in sagittal radius | exit surface change in sagittal radius |
|---|---|---|
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 7-continued shape of meridional line of second fθ lens 607

| | incident surface counter-light source side | exit surface counter-light source side |
|---|---|---|
| R | −10000 | 406.972 |
| ku | 0 | −1.589E+02 |
| B4u | 0 | −3.666E-07 |
| B6u | 0 | 5.348E-11 |
| B8u | 0 | −6.686E-15 |
| B10u | 0 | 5.606E-19 |
| B12u | 0 | −2.306E-23 |
| | light source side | light source side |
| kl | 0 | −1.589E+02 |
| B4l | 0 | −3.681E-07 |
| B6l | 0 | 5.909E-11 |
| B8l | 0 | −8.967E-15 |
| B10l | 0 | 9.408E-19 |
| B12l | 0 | −4.673E-23 | shape of sagittal line of second fθ lens 607

| | incident surface change in sagittal radius | exit surface change in sagittal radius |
|---|---|---|
| r | −100.000 | −18.035 |
| E1 | −2.96115E-05 | 4.559E-05 |
| E2 | −7.992E-05 | 1.156E-04 |
| E3 | 0 | 0 |
| E4 | −2.848E-09 | −3.769E-08 |
| E5 | 0 | 0 |
| E6 | 2.241E-12 | 5.337E-12 |
| E7 | 0 | 0 |
| E8 | −2.121E-16 | −3.371E-16 |
| E9 | 0 | 0 |
| E10 | 0 | 0 |
| | sagittal tilt | sagittal tilt |
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

Note that in Tables 6 and 7, the direction of the optical axis, the axis orthogonal to the optical axis in the main scanning section, and the axis orthogonal to the optical axis in the sub-scanning section in the case where the intersection point of each lens surface and the optical axis is determined as the point of origin are defined as the x axis, the y axis, and the z axis, respectively. In addition, in Tables 6 and 7, the expression "E-x" means "×10$^{-x}$".

The aspheric surface shape (the meridional shape) in the main scanning section of each of the lens surfaces of the first fθ lenses 506 and 606 and the second fθ lenses 507 and 607 of the optical scanning apparatus of this embodiment is defined by the above-described expression (1).

Meanwhile, the aspheric surface shape (the sagittal shape) in the sub-scanning section of each of the lens surfaces of the first fθ lenses 506 and 606 and the second fθ lenses 507 and 607 is defined by the above-described expression (2).

In the meantime, the curvature radius r' in the sub-scanning section continuously varies in accordance with the y coordinate of the lens surface as defined in the above-described expression (3).

In the optical scanning apparatus of this embodiment, the values of $ok_1$ and $ok_2$ turn out to be 1.430 mm and 0.498 mm, respectively, in accordance with the above-described expressions (4) and (5).

Accordingly, the optical scanning apparatus of this embodiment satisfies $ok_2 < ok_1$.

As a consequence, even when the distance on an optical path from the deflection point C0 to the incident surface of the second fθ lens 507 is different from the distance on an optical path from the deflection point D0 to the incident surface of the second fθ lens 607, it is possible to bring the image-side principal planes 150 and 250 close to each other (in other words, to reduce the difference between the distance on the optical path from the deflection point C0 to the image-side principal plane 150 and the distance on the optical path from the deflection point D0 to the image-side principal plane 250).

Meanwhile, in the optical scanning apparatus of this embodiment, the values of $\phi_{11}$ and $\phi_1$ turn out to be −0.0150 and 0.0240, respectively, while the values of $\phi_{21}$ and $\phi_2$ turn out to be −0.0052 and 0.0242, respectively. Thus, the expression (6) is satisfied.

As a consequence, in the optical scanning apparatus of this embodiment, both of magnifications in the sub-scanning direction of the first and second imaging optical systems 85a and 85b can be adjusted to −1.0 and the difference therebetween is substantially equal to 0.

Hence, it is possible to reduce the difference between the Fno values of the first and second imaging optical systems 85a and 85b by reducing the difference in sub-scanning magnification between the first and second imaging optical systems 85a and 85b.

In this way, it is possible to reduce the difference in amount of light between the irradiating light beams that irradiate the first and second scanned surfaces 108 and 208, respectively.

Thus, in the optical scanning apparatus of this embodiment, the second fθ lenses 507 and 607 are configured as described above. Accordingly, it is possible to provide the optical scanning apparatus being small in size while reducing the difference in amount of light between the first and second scanned surfaces 108 and 208, namely, between colors.

Fourth Embodiment

Figure 5:
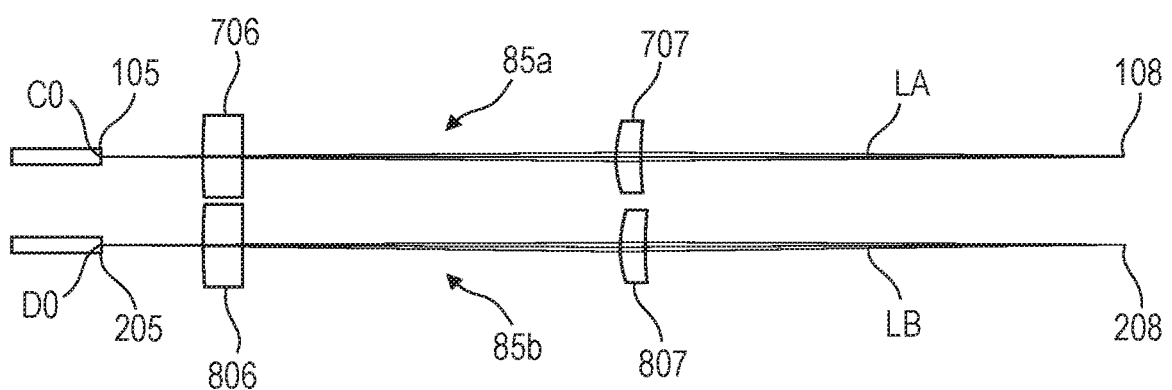
FIG. 5 is a development view in a sub-scanning section of imaging optical systems included in an optical scanning apparatus according to a fourth embodiment.

FIG. 5 shows a development view in the sub-scanning section of the first and second imaging optical systems 85a and 85b included in an optical scanning apparatus according to a third embodiment.

Note that the optical scanning apparatus of this embodiment has the same configuration as the optical scanning apparatus 10 according to the first embodiment except that first fθ lenses 706 and 806 and second fθ lenses 707 and 807 are used instead of the first fθ lenses 106 and 206 and the second fθ lenses 107 and 207. For this reason, the same components will be denoted by the same reference numerals and explanations thereof will be omitted.

Characteristics of the first fθ lenses 706 and 806 and of the second fθ lenses 707 and 807 of the optical scanning apparatus of this embodiment will be listed in the following Tables 8 and 9.

TABLE 8 fθ coefficient, scanning width, and angle of view

| | | |
|---|---|---|
| fθ coefficient | k (mm/rad) | 146 |
| scanning width | W (mm) | 230 |
| maximum angle of view | θ (deg) | 45.1 | refractive indices

| | | |
|---|---|---|
| refractive index of first fθ lens 706 | N5 | 1.528 |
| refractive index of second fθ lens 707 | N6 | 1.528 | deflecting unit

| | | |
|---|---|---|
| number of deflecting surfaces | | 4 |
| circumradius | Rpol (mm) | 10 |
| rotation center to deflection point C0 (optical axis direction) | Xpol (mm) | 5.74 |
| rotation center to deflection point C0 (main scanning direction) | Ypol (mm) | 4.26 | scanning optical system and arrangement

| | | |
|---|---|---|
| deflection point C0 to incident surface of first fθ lens 706 | d12 (mm) | 17.00 |
| incident surface of first fθ lens 706 to exit surface of first fθ lens 706 | d13 (mm) | 6.70 |
| exit surface of first fθ lens 706 to incident surface of second fθ lens 707 | d14 (mm) | 60.95 |
| incident surface of second fθ lens 707 to exit surface of second fθ lens 707 | d15 (mm) | 4.00 |
| exit surface of second fθ lens 707 to first scanned surface 108 | d16 (mm) | 79.35 |
| deflection point C0 to incident surface of second fθ lens 707 | L1 (mm) | 84.65 |
| deflection point C0 to first scanned surface 108 | T1 (mm) | 168.00 |
| amount of sub-scanning eccentricity of second fθ lens 707 | shiftZ (mm) | 0.00 |
| sub-scanning magnification of first scanning optical system 85a | β | 1.00 | shape of meridional line of first fθ lens 706

| | incident surface counter-light source side | exit surface counter-light source side |
|---|---|---|
| R | −97.027 | −45.590 |
| ku | 1.512E+01 | 3.744E+05 |
| B4u | −4.545E−06 | −9.102E−06 |
| B6u | 2.275E−08 | 6.191E−09 |
| B8u | −4.746E−11 | −3.783E−12 |
| B10u | 4.165E−14 | −1.215E−14 |
| B12u | 0 | 0 |

| | light source side | light source side |
|---|---|---|
| kl | 1.512E+01 | 3.744E+05 |
| B4l | −4.545E−06 | −9.170E−06 |
| B6l | 2.275E−08 | 5.615E−09 |
| B8l | −4.746E−11 | −1.747E−12 |
| B10l | 4.165E−14 | −1.399E−14 |
| B12l | 0 | 0 | shape of sagittal line of first fθ lens 706

| | incident surface change in sagittal radius | exit surface change in sagittal radius |
|---|---|---|
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 707

| | incident surface counter-light source side | exit surface counter-light source side |
|---|---|---|
| R | −10000 | 421.357 |
| ku | 0 | −1.402E+02 |
| B4u | 0 | −3.433E−07 |
| B6u | 0 | 5.102E−11 |
| B8u | 0 | −6.901E−15 |
| B10u | 0 | 6.285E−19 |
| B12u | 0 | −2.731E−23 |

| | light source side | light source side |
|---|---|---|
| kl | 0 | −1.402E+02 |
| B4l | 0 | −3.457E−07 |
| B6l | 0 | 5.649E−11 |
| B8l | 0 | −8.915E−15 |
| B10l | 0 | 9.374E−19 |
| B12l | 0 | −4.514E−23 | shape of sagittal line of second fθ lens 707

| | incident surface change in sagittal radius | exit surface change in sagittal radius |
|---|---|---|
| r | 18.000 | 98.828 |
| E1 | 7.95347E−05 | −8.321E−05 |
| E2 | 0.000117654 | 1.117E−04 |
| E3 | 0 | 0 |
| E4 | −1.68586E−09 | 3.871E−08 |
| E5 | 0 | 0 |
| E6 | −3.94688E−12 | −2.937E−11 |
| E7 | 0 | 0 |
| E8 | 4.0161E−16 | 3.231E−15 |
| E9 | 0 | 0 |
| E10 | 0 | 0 |

| | sagittal tilt | sagittal tilt |
|---|---|---|
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 9 fθ coefficient, scanning width, and angle of view

| | | |
|---|---|---|
| fθ coefficient | k (mm/rad) | 146 |
| scanning width | W (mm) | 230 |
| maximum angle of view | θ (deg) | 45.1 |

TABLE 9-continued

| refractive indices | | |
|---|---|---|
| refractive index of first fθ lens 806 | N5 | 1.528 |
| refractive index of second fθ lens 807 | N6 | 1.528 |
| deflecting unit | | |
| number of deflecting surfaces | | 4 |
| circumradius | Rpol (mm) | 10 |
| rotation center to deflection point D0 (optical axis direction) | Xpol (mm) | 5.74 |
| rotation center to deflection point D0 (main scanning direction) | Ypol (mm) | 4.26 |
| scanning optical system and arrangement | | |
| deflection point D0 to incident surface of first fθ lens 806 | d12 (mm) | 17.00 |
| incident surface of first fθ lens 806 to exit surface of first fθ lens 806 | d13 (mm) | 6.70 |
| exit surface of first fθ lens 806 to incident surface of second fθ lens 807 | d14 (mm) | 62.08 |
| incident surface of second fθ lens 807 to exit surface of second fθ lens 807 | d15 (mm) | 3.47 |
| exit surface of second fθ lens 807 to second scanned surface 208 | d16 (mm) | 78.75 |
| deflection point D0 to incident surface of second fθ lens 807 | L1 (mm) | 85.78 |
| deflection point D0 to second scanned surface 208 | T1 (mm) | 168.00 |
| amount of sub-scanning eccentricity of second fθ lens 807 | shiftZ (mm) | 0.00 |
| sub-scanning magnification of second scanning optical system 85b | β | 1.00 | shape of meridional line of first fθ lens 806

| | incident surface counter-light source side | exit surface counter-light source side |
|---|---|---|
| R | −88.949 | −43.131 |
| ku | 1.336E+01 | 6.934E+04 |
| B4u | −6.486E−06 | −1.013E−05 |
| B6u | 2.327E−08 | 4.028E−09 |
| B8u | −4.653E−11 | −4.686E−12 |
| B10u | 4.921E−14 | −9.663E−15 |
| B12u | 0 | 0 |
| | light source side | light source side |
| kl | 1.336E+01 | 6.934E+04 |
| B4l | −6.486E−06 | −1.016E−05 |
| B6l | 2.327E−08 | 3.191E−09 |
| B8l | −4.653E−11 | −1.942E−12 |
| B10l | 4.921E−14 | −1.175E−14 |
| B12l | 0 | 0 | shape of sagittal line of first fθ lens 806

| | incident surface change in sagittal radius | exit surface change in sagittal radius |
|---|---|---|
| r | 100.000 | 100.000 |
| E1 | 0 | 0 |
| E2 | 0 | 0 |
| E3 | 0 | 0 |
| E4 | 0 | 0 |
| E5 | 0 | 0 |
| E6 | 0 | 0 |
| E7 | 0 | 0 |
| E8 | 0 | 0 |
| E9 | 0 | 0 |
| E10 | 0 | 0 |
| | sagittal tilt | sagittal tilt |
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 807

| | incident surface counter-light source side | exit surface counter-light source side |
|---|---|---|
| R | −10000 | 412.898 |
| ku | 0 | −1.272E+02 |
| B4u | 0 | −3.330E−07 |
| B6u | 0 | 4.976E−11 |
| B8u | 0 | −7.094E−15 |
| B10u | 0 | 6.788E−19 |
| B12u | 0 | −3.080E−23 |
| | light source side | light source side |
| kl | 0 | −1.272E+02 |
| B4l | 0 | −3.362E−07 |
| B6l | 0 | 5.501E−11 |
| B8l | 0 | −8.921E−15 |
| B10l | 0 | 9.406E−19 |
| B12l | 0 | −4.504E−23 | shape of sagittal line of second fθ lens 807

| | incident surface change in sagittal radius | exit surface change in sagittal radius |
|---|---|---|
| r | 13.000 | 29.540 |
| E1 | −1.59547E−05 | −1.137E−04 |
| E2 | 4.277E−05 | −5.711E−05 |
| E3 | 0 | 0 |
| E4 | 1.940E−08 | 4.027E−08 |
| E5 | 0 | 0 |
| E6 | −1.017E−11 | −1.577E−11 |
| E7 | 0 | 0 |
| E8 | 1.169E−15 | 1.736E−15 |
| E9 | 0 | 0 |
| E10 | 0 | 0 |
| | sagittal tilt | sagittal tilt |
| M0_1 | 0 | 0 |
| M1_1 | 0 | 0 |
| M2_1 | 0 | 0 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

Note that in Tables 8 and 9, the direction of the optical axis, the axis orthogonal to the optical axis in the main scanning section, and the axis orthogonal to the optical axis in the sub-scanning section in the case where the intersection point of each lens surface and the optical axis is determined as the point of origin are defined as the x axis, the y axis, and the z axis, respectively. In addition, in Tables 8 and 9, the expression "E-x" means "×10$^{-x}$".

The aspheric surface shape (the meridional shape) in the main scanning section of each of the lens surfaces of the first fθ lenses 706 and 806 and the second fθ lenses 707 and 807 of the optical scanning apparatus of this embodiment is defined by the above-described expression (1).

Meanwhile, the aspheric surface shape (the sagittal shape) in the sub-scanning section of each of the lens surfaces of the first fθ lenses 706 and 806 and the second fθ lenses 707 and 807 is defined by the above-described expression (2).

In the meantime, the curvature radius r' in the sub-scanning section continuously varies in accordance with the y coordinate of the lens surface as defined in the above-described expression (3).

In the optical scanning apparatus of this embodiment, the values of $ok_1$ and $ok_2$ turn out to be −2.767 mm and −3.824 mm, respectively, in accordance with the above-described expressions (4) and (5).

Accordingly, the optical scanning apparatus of this embodiment satisfies $ok_2 < ok_1$.

As a consequence, even when the distance on an optical path from the deflection point C0 to the incident surface of the second fθ lens 707 is different from the distance on an optical path from the deflection point D0 to the incident surface of the second fθ lens 807, it is possible to bring the image-side principal planes 150 and 250 close to each other (in other words, to reduce the difference between the distance on the optical path from the deflection point C0 to the image-side principal plane 150 and the distance on the optical path from the deflection point D0 to the image-side principal plane 250).

Meanwhile, in the optical scanning apparatus of this embodiment, the values of $\phi_{11}$ and $\phi_1$ turn out to be 0.0291 and 0.0242, respectively, while the values of $\phi_{21}$ and $\phi_2$ turn out to be 0.0403 and 0.0242, respectively. Thus, the expression (6) is satisfied.

As a consequence, in the optical scanning apparatus of this embodiment, both of magnifications in the sub-scanning direction of the first and second imaging optical systems 85a and 85b can be adjusted to −1.0 and the difference therebetween is substantially equal to 0.

Hence, it is possible to reduce the difference between the Fno values of the first and second imaging optical systems 85a and 85b by reducing the difference in sub-scanning magnification between the first and second imaging optical systems 85a and 85b.

In this way, it is possible to reduce the difference in amount of light between the irradiating light beams that irradiate the first and second scanned surfaces 108 and 208, respectively.

Thus, in the optical scanning apparatus of this embodiment, the second fθ lenses 707 and 807 are configured as described above. Accordingly, it is possible to provide the optical scanning apparatus being small in size while reducing the difference in amount of light between the first and second scanned surfaces 108 and 208, namely, between colors.

Fifth Embodiment

Figure 6A:
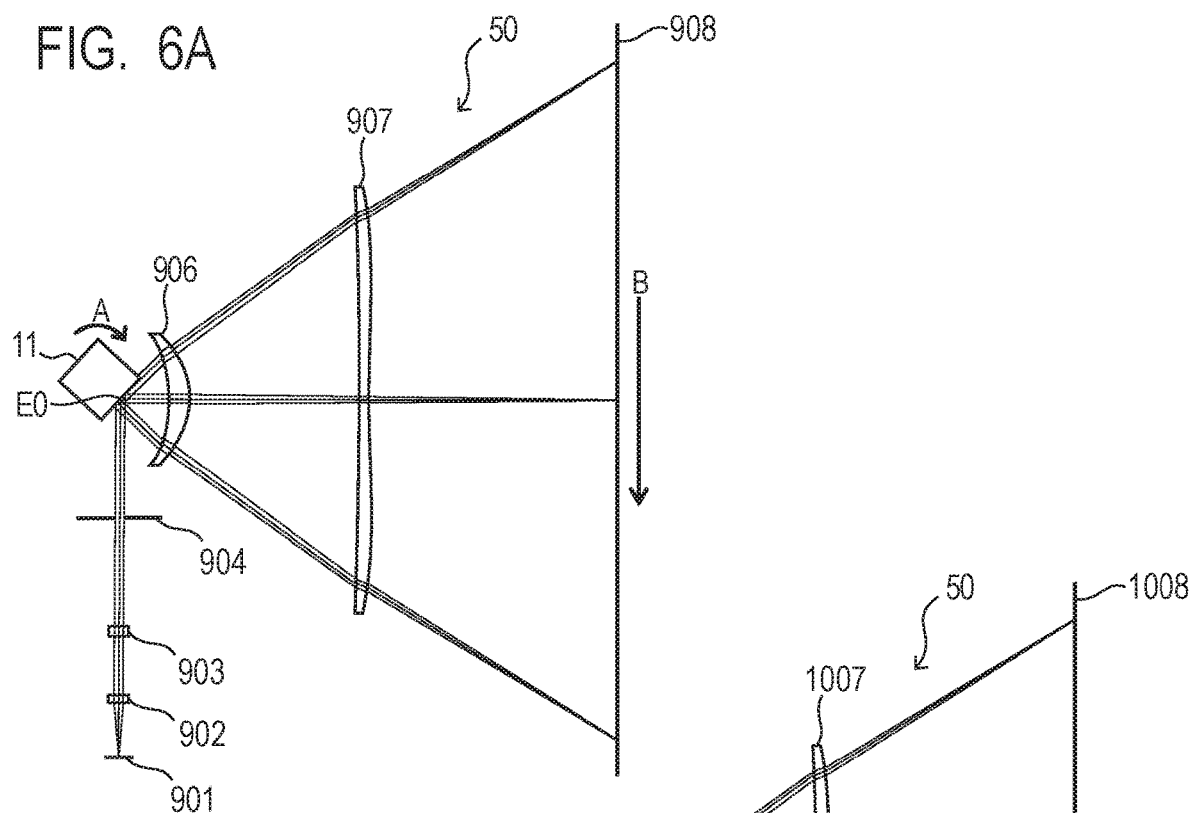
FIG. 6A is a development view in a main scanning section of part of an optical scanning apparatus according to a fifth embodiment.
Figure 6B:
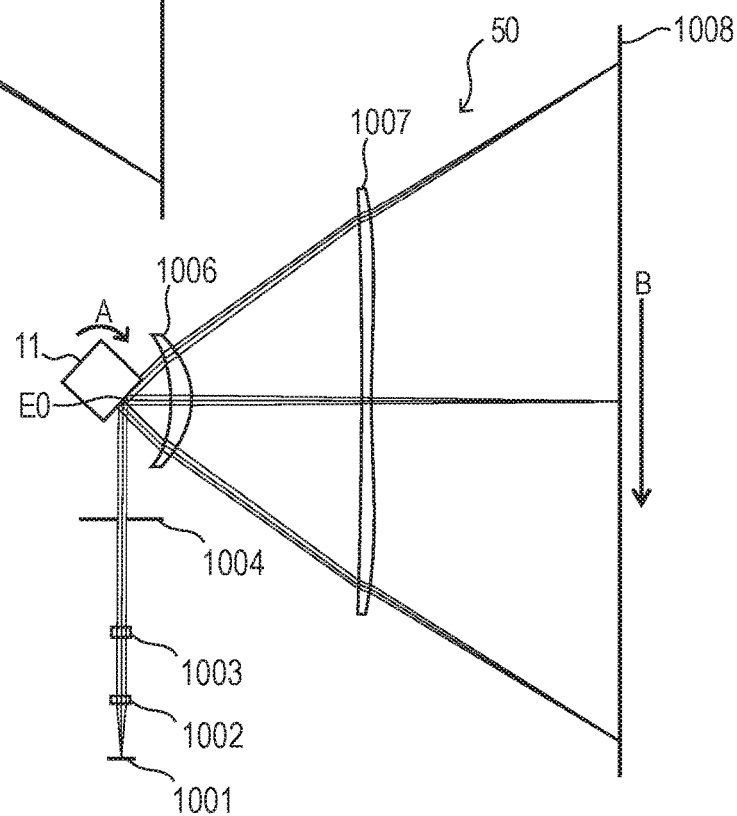
FIG. 6B is another development view in the main scanning section of part of the optical scanning apparatus according to the fifth embodiment.
Figure 6C:
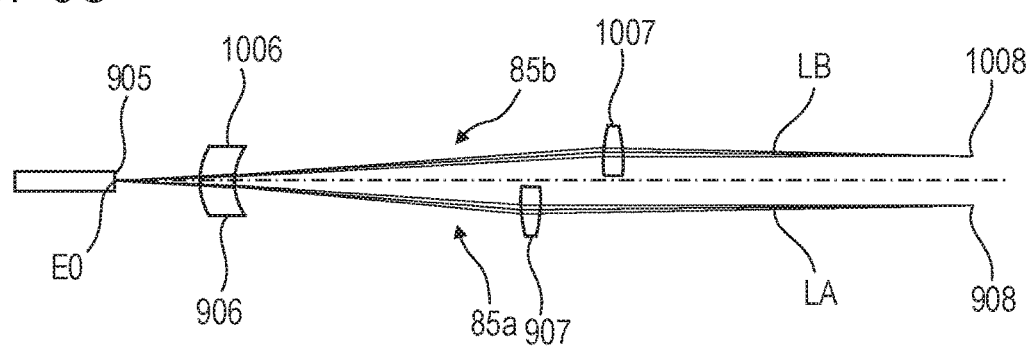
FIG. 6C is a development view in a sub-scanning section of imaging optical systems included in the optical scanning apparatus according to the fifth embodiment.

FIGS. 6A and 6B show development views in a main scanning section of part of an optical scanning apparatus 50 according to a fifth embodiment, respectively. FIG. 6C shows a development view in a sub-scanning section of imaging optical systems included in the optical scanning apparatus 50 according to the fifth embodiment.

The optical scanning apparatus 50 of this embodiment includes first and second light sources 901 and 1001, first and second collimator lenses 902 and 1002, first and second cylindrical lenses 903 and 1003, and first and second aperture stops 904 and 1004.

Moreover, the optical scanning apparatus 50 of this embodiment includes a deflecting unit 11, first fθ lenses 906 and 1006, (fifth and sixth imaging elements), and second fθ lenses 907 and 1007 (first and second imaging elements).

Semiconductor laser or the like is used for each of the first and second light sources 901 and 1001.

The first and second collimator lenses 902 and 1002 convert light fluxes LA and LB (first and second light fluxes) emitted from the first and second light sources 901 and 1001 into parallel light fluxes. Here, the parallel light fluxes include not only strictly parallel light fluxes but also substantially parallel light fluxes such as weak divergent light fluxes and weak convergent light fluxes.

Each of the first and second cylindrical lenses 903 and 1003 has a finite power (a refractive power) in a sub-scanning section. The light fluxes LA and LB passed through the first and second collimator lenses 902 and 1002 are condensed in the sub-scanning direction by the first and second cylindrical lenses 903 and 1003.

The first and second aperture stops 904 and 1004 control light flux diameters of the light fluxes LA and LB passed through the first and second cylindrical lenses 903 and 1003.

Thus, the light fluxes LA and LB emitted from the first and second light sources 901 and 1001 are condensed only in the sub-scanning direction in the vicinity of a deflecting surface 905 of the deflecting unit 11, and are formed into linear images each being long in the main scanning direction.

The deflecting unit 11 is rotated in a direction of an arrow A in FIGS. 6A and 6B by a not-illustrated driving unit such as a motor, thus deflecting the light fluxes incident on the deflecting unit 11. Here, the deflecting unit 11 is formed from a polygon mirror, for example.

Each of the first fθ lens 906 and the second fθ lens 907 is an anamorphic imaging lens having different powers in the main scanning section and in the sub-scanning section, which is configured to condense (guide) the light flux LA deflected by the deflecting surface 905 of the deflecting unit 11 onto a first scanned surface 908.

Each of the first fθ lens 1006 and the second fθ lens 1007 is an anamorphic imaging lens having different powers in the main scanning section and in the sub-scanning section, which is configured to condense (guide) the light flux LB deflected by the deflecting surface 905 of the deflecting unit 11 onto a second scanned surface 1008.

Note that an exit surface of each of the first fθ lenses 906 and 1006 is a sagittal tilt variable surface on which an amount of sagittal tilt varies in the main scanning direction.

In the optical scanning apparatus 50 of this embodiment, the first incident optical system 75a is formed from the first collimator lens 902, the first cylindrical lens 903, and the first aperture stop 904. Moreover, the second incident optical system 75b is formed from the second collimator lens 1002, the second cylindrical lens 1003, and the second aperture stop 1004.

In the meantime, in the optical scanning apparatus 50 of this embodiment, the first imaging optical system 85a is formed from the first fθ lens 906 and the second fθ lens 907. Moreover, the second imaging optical system 85b is formed from the first fθ lens 1006 and the second fθ lens 1007.

In the optical scanning apparatus 50 of this embodiment, optical axes of the first and second incident optical systems 75a and 75b in the sub-scanning section form angles of +3.0 degrees and −3.0 degrees, respectively, with respect to the main scanning section.

The light flux LA emitted from a light emitting point of the first light source 901 is converted into the parallel light flux by the first collimator lens 902.

Then, the converted light flux LA is condensed in the sub-scanning direction by the first cylindrical lens 903, passed through the first aperture stop 904, and obliquely incident on the deflecting surface 905 of the deflecting unit 11 from an upper side in the sub-scanning direction.

The light flux LA emitted from the first light source 901 and incident on the deflecting surface 905 of the deflecting unit 11 is subjected to deflection scanning by the deflecting unit 11 and is then condensed on the first scanned surface 908 by the first imaging optical system 85a, thus scanning the first scanned surface 908 at a uniform velocity.

The light flux LB emitted from a light emitting point of the second light source 1001 is converted into the parallel light flux by the second collimator lens 1002.

Then, the converted light flux LB is condensed in the sub-scanning direction by the second cylindrical lens 1003, passed through the second aperture stop 1004, and incident obliquely on a deflecting surface 1005 of the deflecting unit 11 from a lower side in the sub-scanning direction.

The light flux LB emitted from the second light source 1001 and incident on the deflecting surface 1005 of the deflecting unit 11 is subjected to deflection scanning by the deflecting unit 11 and is then condensed on the second scanned surface 1008 by the second imaging optical system 85b, thus scanning the second scanned surface 1008 at a uniform velocity.

Here, the deflecting unit 11 is rotated in the direction A in FIGS. 6A and 6B. Accordingly, the light fluxes LA and LB subjected to the deflection scanning scan the first and second scanned surfaces 908 and 1008 in a direction B in FIGS. 6A and 6B.

Meanwhile, reference numeral E0 denotes a deflection point (an axial deflection point) on the deflecting surface 905 of the deflecting unit 11 relative to the principal ray of the axial flux. In terms of the sub-scanning direction, the light fluxes LA and LB emitted from the first and second light sources 901 and 1001 cross each other at the deflection point E0. In the meantime, the deflection point E0 serves as a reference point of the first and second imaging optical systems 85a and 85b.

Note that first and second photosensitive drums 908 and 1008 are used as the first and second scanned surfaces 908 and 1008 in this embodiment.

Meanwhile, exposure distribution in the sub-scanning direction on the first and second photosensitive drums 908 and 1008 is formed by rotating the first and second photosensitive drums 908 and 1008 in the sub-scanning direction in each session of main scanning exposure.

Next, characteristics of the first and second incident optical systems 75a and 75b and the first and second imaging optical systems 85a and 85b of the optical scanning apparatus 50 of this embodiment will be listed in the following Tables 10 to 12.

TABLE 10

| characteristics of light sources 901 and 1001 | | |
|---|---|---|
| number of light emitting points | N (points) | 2 |
| rotation angles of light sources 901 and 1001 | (deg) | −6.54 |
| array | (dimensions) | 1 |
| pitch | pitch(mm) | 0.09 |
| wavelength | λ(nm) | 790 |
| incident polarization to deflecting surface 905 | | p polarization |
| full angle at half maximum in main scanning direction | FFPy (deg) | 12.00 |
| full angle at half maximum in sub-scanning direction | FFPz (deg) | 30.00 |
| forms of stops | | |
| | main scanning direction | sub-scanning direction |
| aperture stops 904 and 1004 | 3.050 | 0.782 |
| refractive indices | | |
| collimator lenses 902 and 1002 | N1 | 1.762 |
| cylindrical lenses 903 and 1003 | N2 | 1.524 |
| forms of optical elements | | |
| | main scanning direction | sub-scanning direction |
| curvature radius of incident surfaces of collimator lenses 902 and 1002 | r1a (mm) | ∞ | ∞ |
| curvature radius of exit surfaces of collimator lenses 902 and 1002 | r1b (mm) | −15.216 | −15.216 |
| curvature radius of incident surfaces of cylindrical lenses 903 and 1003 | r2a (mm) | ∞ | 41.028 |
| curvature radius of exit surfaces of cylindrical lenses 903 and 1003 | r2b (mm) | ∞ | ∞ |
| focal lengths | | |
| | main scanning direction | sub-scanning direction |
| collimator lenses 902 and 1002 | fcol (mm) | 19.98 | 19.98 |
| cylindrical lenses 903 and 1003 | fcyl (mm) | ∞ | 78.30 |

TABLE 10-continued

| arrangement | | |
|---|---|---|
| light sources 901 and 1001 to collimator lenses 902 and 1002 | d0 (mm) | 18.79 |
| incident surfaces of collimator lenses 902 and 1002 to exit surfaces of collimator lenses 902 and 1002 | d1 (mm) | 2.40 |
| exit surfaces of collimator lenses 902 and 1002 to incident surfaces of cylindrical lenses 903 and 1003 | d2 (mm) | 20.06 |
| incident surfaces of cylindrical lenses 903 and 1003 to exit surfaces of cylindrical lenses 903 and 1003 | d3 (mm) | 3.00 |
| exit surfaces of cylindrical lenses 903 and 1003 to aperture stops 904 and 1004 | d4 (mm) | 36.67 |
| aperture stops 904 and 1004 to deflection point E0 | d5 (mm) | 40.33 |
| incident angle in main scanning section of light exited from aperture stop 904 into deflecting surface 905 | A1 (deg) | 90.00 |
| incident angle in main scanning section of light exited from aperture stop 1004 into deflecting surface 905 | A2 (deg) | 90.00 |
| incident angle in sub-scanning section of light exited from aperture stop 904 into deflecting surface 905 | A3 (deg) | −3.00 |
| incident angle in sub-scanning section of light exited from aperture stop 1004 into deflecting surface 905 | A4 (deg) | 3.00 |

TABLE 11

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of first fθ lens 906 | N5 | 1.528 |
| refractive index of second fθ lens 907 | N6 | 1.528 |
| deflecting unit | | |
| number of deflecting surfaces | | 4 |
| circumradius | Rpol (mm) | 10 |
| rotation center to deflection point E0 (optical axis direction) | Xpol (mm) | 5.74 |
| rotation center to deflection point E0 (main scanning direction) | Ypol (mm) | 4.26 |
| scanning optical system and arrangement | | |
| deflection point E0 to incident surface of first fθ lens 906 | d12 (mm) | 17.00 |
| incident surface of first fθ lens 906 to exit surface of first fθ lens 906 | d13 (mm) | 6.70 |
| exit surface of first fθ lens 906 to incident surface of second fθ lens 907 | d14 (mm) | 56.30 |
| incident surface of second fθ lens 907 to exit surface of second fθ lens 907 | d15 (mm) | 3.50 |
| exit surface of second fθ lens 907 to first scanned surface 908 | d16 (mm) | 84.50 |
| deflection point E0 to incident surface of second fθ lens 907 | L1 (mm) | 80.00 |
| deflection point E0 to first scanned surface 908 | T1 (mm) | 168.00 |
| amount of sub-scanning eccentricity of second fθ lens 907 | shiftZ (mm) | 5.67 |
| sub-scanning magnification of first scanning optical system 85a | β | 1.00 | shape of meridional line of first fθ lens 906

| | incident surface counter-light source side | exit surface counter-light source side |
|---|---|---|
| R | −39.866 | −28.253 |
| ku | 2.065E+00 | 8.659E+05 |

TABLE 11-continued

| B4u | 9.292E−06 | −1.398E−05 |
|---|---|---|
| B6u | 3.110E−08 | 2.362E−08 |
| B8u | −1.025E−10 | −2.189E−11 |
| B10u | 1.310E−13 | −2.171E−14 |
| B12u | 0 | 0 |

| | light source side | light source side |
|---|---|---|
| kl | 2.065E+00 | 8.659E+05 |
| B4l | 9.292E−06 | −1.412E−05 |
| B6l | 3.110E−08 | 2.454E−08 |
| B8l | −1.025E−10 | −2.394E−11 |
| B10l | 1.310E−13 | −1.979E−14 |
| B12l | 0 | 0 | shape of sagittal line of first fθ lens 906

| | incident surface change in sagittal radius | exit surface change in sagittal radius |
|---|---|---|
| r | 13.000 | 11.268 |
| E1 | 0 | 0.0001455 |
| E2 | 0 | −0.0001686 |
| E3 | 0 | 0 |
| E4 | 0 | −4.846E−07 |
| E5 | 0 | 0 |
| E6 | 0 | 1.156E−09 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | −0.03845 |
| M1_1 | 0 | 9.266E−06 |
| M2_1 | 0 | 8.686E−05 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |

TABLE 11-continued

| | | |
|---|---|---|
| M11_1 | 0 | 0 |
| M12_1 | 0 | 0 | shape of meridional line of second fθ lens 907

| | incident surface counter-light source side | exit surface counter-light source side |
|---|---|---|
| R | −10000 | 228.410 |
| ku | 0 | −5.462E+01 |
| B4u | 0 | −5.399E−07 |
| B6u | 0 | 1.054E−10 |
| B8u | 0 | −1.701E−14 |
| B10u | 0 | 1.722E−18 |
| B12u | 0 | −7.826E−23 |
| | light source side | light source side |
| kl | 0 | −5.462E+01 |
| B4l | 0 | −5.411E−07 |
| B6l | 0 | 1.067E−10 |
| B8l | 0 | −1.777E−14 |
| B10l | 0 | 1.890E−18 |
| B12l | 0 | −9.085E−23 | shape of sagittal line of second fθ lens 907

| | incident surface change in sagittal radius | exit surface change in sagittal radius |
|---|---|---|
| r | 60.676 | −31.725 |
| E1 | 0 | 2.169E−04 |
| E2 | 0.0004470 | 3.483E−05 |
| E3 | 0 | 0 |
| E4 | −4.827E−08 | 5.550E−09 |
| E5 | 0 | 0 |
| E6 | −2.372E−12 | −3.405E−12 |
| E7 | 0 | 0 |
| E8 | 2.304E−15 | 2.138E−16 |
| E9 | 0 | 0 |
| E10 | 0 | 0 |
| | sagittal tilt | sagittal tilt |
| M0_1 | −0.09462 | 0.08550 |
| M1_1 | −0.0003547 | −0.0003581 |
| M2_1 | −2.849E−06 | −3.393E−05 |
| M3_1 | 5.463E−08 | 7.297E−08 |
| M4_1 | −1.278E−09 | 9.985E−09 |
| M5_1 | −2.873E−12 | −1.851E−11 |
| M6_1 | 1.077E−12 | −2.695E−12 |
| M7_1 | −2.305E−15 | 1.912E−15 |
| M8_1 | 2.333E−16 | 7.635E−16 |
| M9_1 | 1.496E−19 | −2.569E−19 |
| M10_1 | −2.586E−20 | −4.568E−20 |
| M11_1 | 0 | 0 |
| M12_1 | 0 | 0 |

TABLE 12 fθ coefficient, scanning width, and angle of view

| | | |
|---|---|---|
| fθ coefficient | k (mm/rad) | 146 |
| scanning width | W (mm) | 230 |
| maximum angle of view | θ (deg) | 45.1 | refractive indices

| | | |
|---|---|---|
| refractive index of first fθ lens 1006 | N5 | 1.528 |
| refractive index of second fθ lens 1007 | N6 | 1.528 | deflecting unit

| | | |
|---|---|---|
| number of deflecting surfaces | | 4 |
| circumradius | Rpol (mm) | 10 |
| rotation center to deflection point E0 (optical axis direction) | Xpol (mm) | 5.74 |
| rotation center to deflection point E0 (main scanning direction) | Ypol (mm) | 4.26 |

TABLE 12-continued scanning optical system and arrangement

| | | |
|---|---|---|
| deflection point E0 to incident surface of first fθ lens 1006 | d12 (mm) | 17.00 |
| incident surface of first fθ lens 1006 to exit surface of first fθ lens 1006 | d13 (mm) | 6.70 |
| exit surface of first fθ lens 1006 to incident surface of second fθ lens 1007 | d14 (mm) | 72.30 |
| incident surface of second fθ lens 1007 to exit surface of second fθ lens 1007 | d15 (mm) | 3.50 |
| exit surface of second fθ lens 1007 to second scanned surface 1008 | d16 (mm) | 68.50 |
| deflection point E0 to incident surface of second fθ lens 1007 | L1 (mm) | 96.00 |
| deflection point E0 to second scanned surface 1008 | T1 (mm) | 168.00 |
| amount of sub-scanning eccentricity of second fθ lens 1007 | shiftZ (mm) | 6.86 |
| sub-scanning magnification of second scanning optical system 85b | β | 1.00 | shape of meridional line of first fθ lens 1006

| | incident surface counter-light source side | exit surface counter-light source side |
|---|---|---|
| R | −49.912 | −33.570 |
| ku | 3.517E+00 | 8.385E+04 |
| B4u | 8.144E−06 | −1.046E−05 |
| B6u | 1.731E−08 | 1.703E−08 |
| B8u | −6.571E−11 | −2.092E−11 |
| B10u | 8.472E−14 | −8.007E−15 |
| B12u | 0 | 0 |
| | light source side | light source side |
| kl | 3.517E+00 | 8.385E+04 |
| B4l | 8.144E−06 | −1.050E−05 |
| B6l | 1.731E−08 | 1.749E−08 |
| B8l | −6.571E−11 | −2.257E−11 |
| B10l | 8.472E−14 | −6.096E−15 |
| B12l | 0 | 0 | shape of sagittal line of first fθ lens 1006

| | incident surface change in sagittal radius | exit surface change in sagittal radius |
|---|---|---|
| r | 13.000 | 22.244 |
| E1 | 0 | −0.0001642 |
| E2 | 0 | −0.001204 |
| E3 | 0 | 0 |
| E4 | 0 | 1.538E−06 |
| E5 | 0 | 0 |
| E6 | 0 | −9.773E−10 |
| E7 | 0 | 0 |
| E8 | 0 | 0 |
| E9 | 0 | 0 |
| E10 | 0 | 0 |
| | sagittal tilt | sagittal tilt |
| M0_1 | 0 | 0.0810 |
| M1_1 | 0 | −1.262E−06 |
| M2_1 | 0 | −9.130E−05 |
| M3_1 | 0 | −9.910E−05 |
| M4_1 | 0 | 1.107E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

TABLE 12-continued shape of meridional line of second fθ lens 1007

| | incident surface counter-light source side | exit surface counter-light source side |
|---|---|---|
| R | −10000 | 279.878 |
| ku | 0 | −5.367E+01 |
| B4u | 0 | −3.311E−07 |
| B6u | 0 | 4.279E−11 |
| B8u | 0 | −4.922E−15 |
| B10u | 0 | 3.461E−19 |
| B12u | 0 | −1.034E−23 |

| | light source side | light source side |
|---|---|---|
| kl | 0 | −5.367E+01 |
| B4l | 0 | −3.335E−07 |
| B6l | 0 | 4.318E−11 |
| B8l | 0 | −4.880E−15 |
| B10l | 0 | 3.327E−19 |
| B12l | 0 | −9.723E−24 | shape of sagittal line of second fθ lens 1007

| | incident surface change in sagittal radius | exit surface change in sagittal radius |
|---|---|---|
| r | 22.604 | −1000.000 |
| E1 | 9.474E−05 | 0.000E+00 |
| E2 | 8.693E−05 | 0.000E+00 |
| E3 | 0 | 0 |
| E4 | −4.848E−09 | 0.000E+00 |
| E5 | 0 | 0 |
| E6 | 1.645E−13 | 0.000E+00 |
| E7 | 0 | 0 |
| E8 | −2.038E−17 | 0.000E+00 |
| E9 | 0 | 0 |
| E10 | 0 | 0 |

| | sagittal tilt | sagittal tilt |
|---|---|---|
| M0_1 | 0.1683 | −0.0274 |
| M1_1 | 0.0002480 | 0.0002605 |
| M2_1 | −6.372E−06 | 1.325E−05 |
| M3_1 | −4.718E−08 | −4.429E−08 |
| M4_1 | 2.700E−09 | −5.426E−10 |
| M5_1 | 5.354E−28 | −2.061E−28 |
| M6_1 | −3.256E−14 | 3.757E−13 |
| M7_1 | −8.193E−16 | −3.438E−16 |
| M8_1 | −1.575E−16 | −1.071E−16 |
| M9_1 | 2.174E−20 | −6.387E−20 |
| M10_1 | 3.849E−21 | −6.178E−21 |
| M11_1 | 0 | 0 |
| M12_1 | 0 | 0 |

Note that in Tables 10 to 12, the direction of the optical axis, the axis orthogonal to the optical axis in the main scanning section, and the axis orthogonal to the optical axis in the sub-scanning section in the case where the intersection point of each lens surface and the optical axis is determined as the point of origin are defined as the x axis, the y axis, and the z axis, respectively. In addition, in Tables 11 and 12, the expression "E-x" means "×$10^{-x}$".

The aspheric surface shape (the meridional shape) in the main scanning section of each of lens surfaces of the first fθ lenses 906 and 1006 and the second fθ lenses 907 and 1007 of the optical scanning apparatus 50 of this embodiment is defined by the above-described expression (1).

Meanwhile, the aspheric surface shape (the sagittal shape) in the sub-scanning section of each of the lens surfaces of the first fθ lenses 906 and 1006 and the second fθ lenses 907 and 1007 is defined by the above-described expression (2).

Note that the amount of sagittal tilt in this embodiment corresponds to a value $M_{01}$. Accordingly, the sagittal tilt surface corresponds to a surface having the value of $M_{01}$ not equal to 0, and the sagittal tilt variable surface corresponds to a surface having at least one of values $M_{j1}$ (j=1 to 12) not equal to 0.

In the meantime, the curvature radius r' in the sub-scanning section continuously varies in accordance with the y coordinate of the lens surface as defined in the above-described expression (3).

Figure 7:
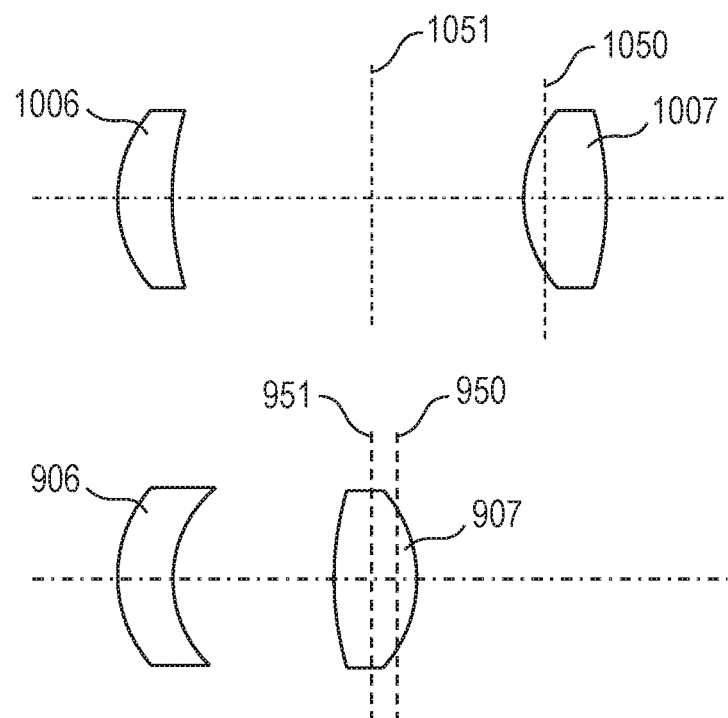
FIG. 7 is a view showing principal plane positions of respective fθ lenses included in the optical scanning apparatus according to the fifth embodiment.

FIG. 7 shows principal plane positions of the first fθ lenses 906 and 1006 located closest to the deflecting unit 11 and of the second fθ lenses 907 and 1007 having the strongest refractive power in the sub-scanning section (including the optical axis), respectively, in the first and second imaging optical systems 85a and 85b included in the optical scanning apparatus 50 of this embodiment.

As shown in FIG. 7, the second fθ lenses 907 and 1007 include image-side principal planes 950 and 1050, respectively.

Moreover, the image-side principal planes 950 and 1050 are located away by the distances $ok_1$ and $ok_2$ from the positions of passage of the axial rays on the exit surfaces of the second fθ lenses 907 and 1007, respectively.

In the optical scanning apparatus 50 of this embodiment, the values of $ok_1$ and $ok_2$ turn out to be −0.797 mm and −2.242 mm, respectively, in accordance with the above-described expressions (4) and (5).

Accordingly, the optical scanning apparatus 50 of this embodiment satisfies $ok_2 < ok_1$.

As a consequence, even when the distance on an optical path from the deflection point E0 to the incident surface of the second fθ lens 907 is different from the distance on an optical path from the deflection point E0 to the incident surface of the second fθ lens 1007, it is possible to bring the image-side principal planes 950 and 1050 close to each other (in other words, to reduce the difference between the distance on the optical path from the deflection point E0 to the image-side principal plane 950 and the distance on the optical path from the deflection point E0 to the image-side principal plane 1050).

Meanwhile, in the optical scanning apparatus 50 of this embodiment, the values of $\phi_{11}$ and $\phi_1$ turn out to be 0.0087 and 0.0250, respectively, while the values of $\phi_{21}$ and $\phi_2$ turn out to be 0.0234 and 0.0239, respectively. Thus, the expression (6) is satisfied.

In the meantime, the first and second imaging optical systems 85a and 85b of the optical scanning apparatus 50 of this embodiment include image-side principal planes 951 and 1051, respectively.

Moreover, in order to reduce the difference in sub-scanning magnification between the first and second imaging optical systems 85a and 85b, the first fθ lenses 906 and 1006 of the optical scanning apparatus 50 of this embodiment also have refractive powers in the sub-scanning section (including the optical axis).

In the optical scanning apparatus 50 of this embodiment, the second fθ lens 907 is located closer to the deflecting unit 11 than the second fθ lens 1007 is.

Accordingly, in order to bring the image-side principal planes 951 and 1051 of the first and second imaging optical systems 85a and 85b close to each other, it is necessary to set the refractive power of the first fθ lens 906 lower than the refractive power of the first fθ lens 1006.

Here, assuming that the refractive power of the first fθ lens 906 is $\phi_5$ and the refractive power of the first fθ lens 1006 is $\phi_6$, the optical scanning apparatus 50 of this embodiment brings about $\phi_5 = 0.0021$ and $\phi_6 = 0.0211$.

In other words, the refractive power $\phi_5$ of the first fθ lens 906 is lower than the refractive power $\phi_6$ of the first fθ lens 1006.

As a consequence, in the optical scanning apparatus 50 of this embodiment, both of magnifications in the sub-scanning direction of the first and second imaging optical systems 85a and 85b can be adjusted to −1.0 and the difference therebetween is substantially equal to 0.

Hence, it is possible to reduce the difference between the Fno values of the first and second imaging optical systems 85a and 85b by reducing the difference in sub-scanning magnification between the first and second imaging optical systems 85a and 85b.

In this way, it is possible to reduce the difference in amount of light between the irradiating light beams that irradiate the first and second scanned surfaces 908 and 1008, respectively.

Meanwhile, when curvature radii in the sub-scanning section including the optical axis of the incident surface and the exit surface of the second fθ lens 907 are defined as $R_{11}$ and $R_{12}$, respectively, values of $|R_{11}|$ and $|R_{12}|$ turn out to be 60.68 and 31.72 in the optical scanning apparatus 50 of this embodiment.

In the meantime, when curvature radii in the sub-scanning section including the optical axis of the incident surface and the exit surface of the second fθ lens 1007 are defined as $R_{21}$ and $R_{22}$, respectively, values of $|R_{21}|$ and $|R_{22}|$ turn out to be 22.60 and 1000 in the optical scanning apparatus 50 of this embodiment.

The optical scanning apparatus 50 of this embodiment satisfies relations of $|R_{11}|>|R_{12}|$ and $|R_{21}|<|R_{22}|$, which represent a desirable configuration for increasing the distance between the second fθ lenses 907 and 1007, or in other words, for locating the second fθ lenses 907 and 1007 away from each other.

Thus, in the optical scanning apparatus 50 of this embodiment, the first fθ lenses 906 and 1006 and the second fθ lenses 907 and 1007 are configured as described above. Accordingly, it is possible to provide the optical scanning apparatus being small in size while reducing the difference in amount of light between the first and second scanned surfaces 908 and 1008, namely, between colors.

Sixth Embodiment

Figure 8A:
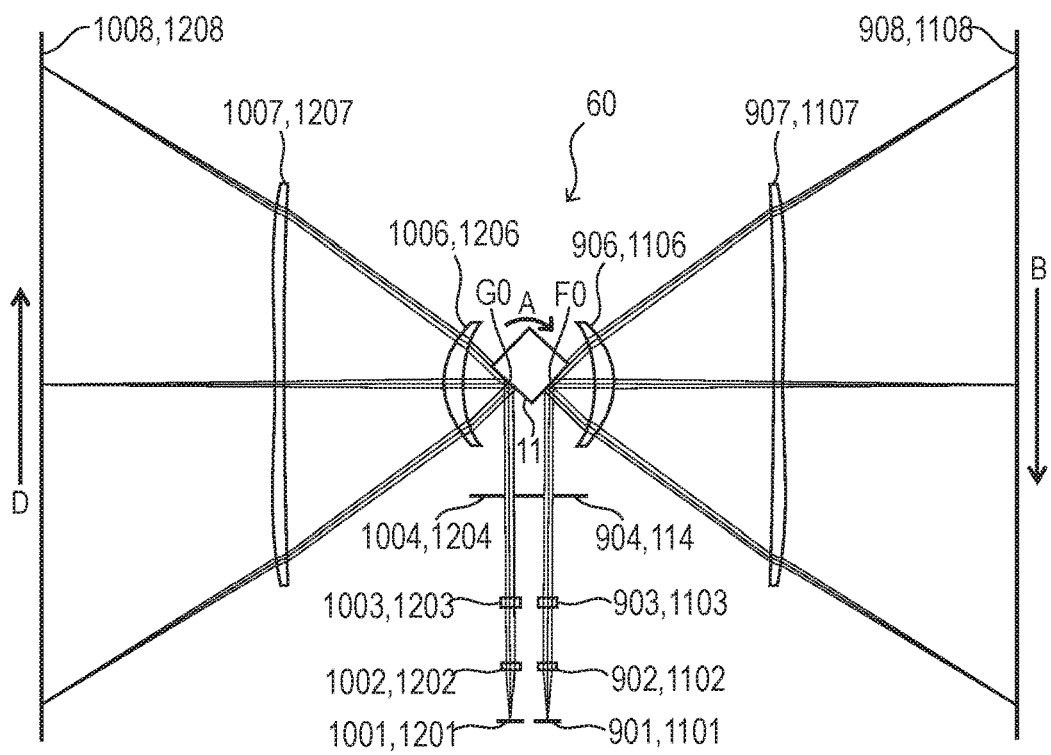
FIG. 8A is a development view in a main scanning section of an optical scanning apparatus according to a sixth embodiment.
Figure 8B:
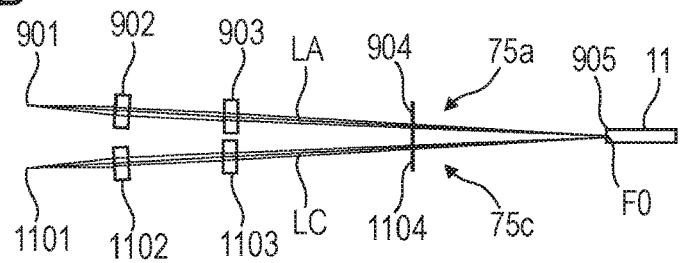
FIG. 8B is a development view in a sub-scanning section of incident optical systems included in the optical scanning apparatus according to the sixth embodiment.
Figure 8C:
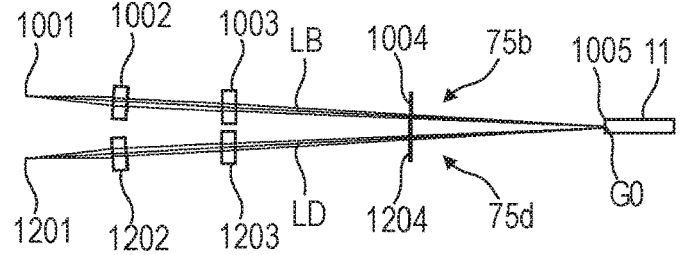
FIG. 8C is a development view in the sub-scanning section of another incident optical systems included in the optical scanning apparatus according to the sixth embodiment.
Figure 8D:
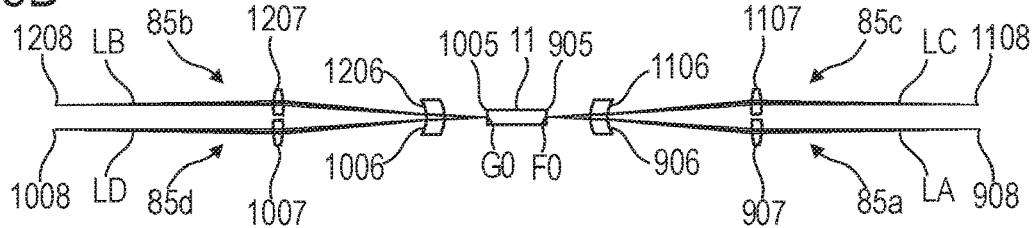
FIG. 8D is a development view in the sub-scanning section of imaging optical systems included in the optical scanning apparatus according to the sixth embodiment.
Figure 9:
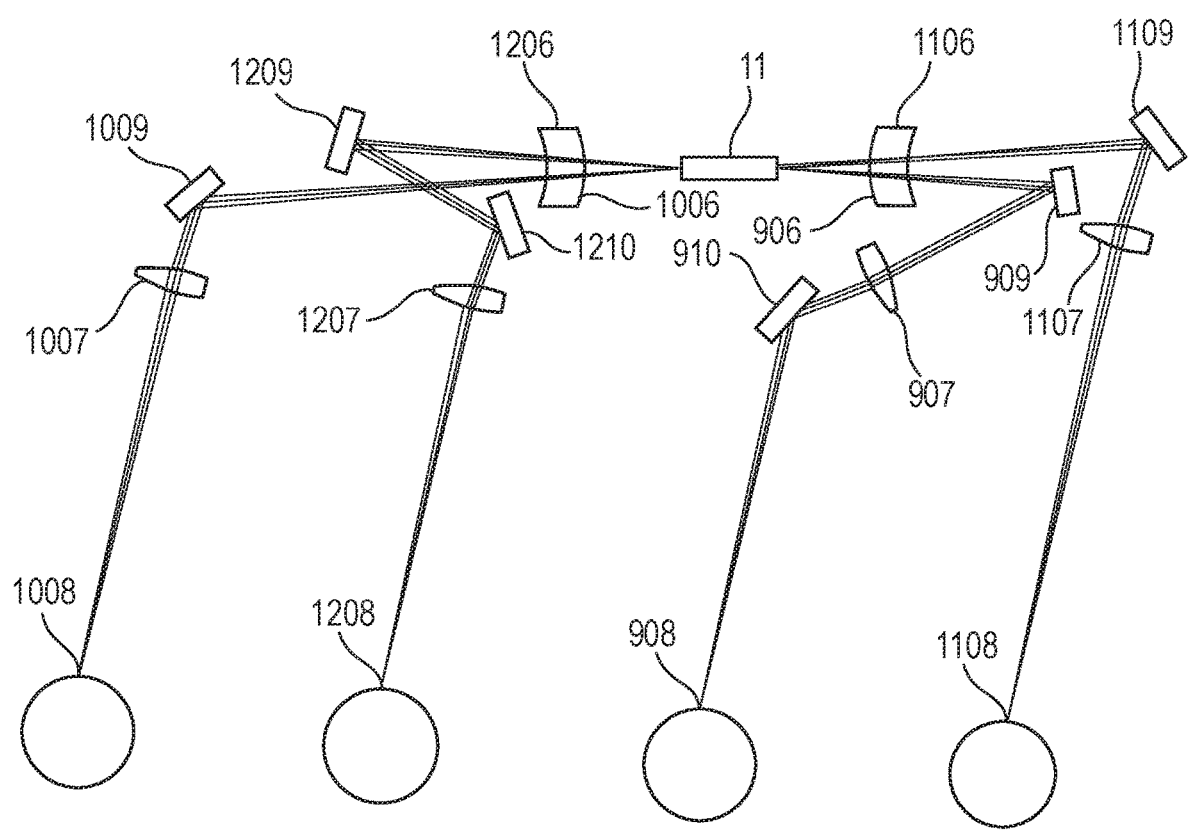
FIG. 9 is a sub-scanning sectional view of the imaging optical systems included in the optical scanning apparatus according to the sixth embodiment.

FIG. 8A shows a development view in a main scanning section of an optical scanning apparatus 60 according to a sixth embodiment. FIGS. 8B and 8C show development views in a sub-scanning section of incident optical systems included in the optical scanning apparatus 60 according to the sixth embodiment, respectively. FIG. 8D shows a development view in the sub-scanning section of imaging optical systems included in the optical scanning apparatus 60 according to the sixth embodiment. FIG. 9 shows a sub-scanning sectional view of the imaging optical systems included in the optical scanning apparatus 60 according to the sixth embodiment.

The optical scanning apparatus 60 of this embodiment includes first, second, third, and fourth light sources 901, 1001, 1101, and 1201, and first, second, third, and fourth collimator lenses 902, 1002, 1102, and 1202. Moreover, the optical scanning apparatus 60 of this embodiment includes first, second, third, and fourth cylindrical lenses 903, 1003, 1103, and 1203, and first, second, third, and fourth aperture stops 904, 1004, 1104, and 1204.

Furthermore, the optical scanning apparatus 60 of this embodiment includes the deflecting unit 11, the first fθ lenses 906 and 1006, (the fifth and sixth imaging elements), and first fθ lenses 1106 and 1206. In addition, the optical scanning apparatus 60 of this embodiment includes second fθ lenses 907, 1007, 1107, and 1207 (first, second, third, and fourth imaging elements), and reflective members 909, 910, 1009, 1109, 1209, and 1210.

Semiconductor laser or the like is used for each of the first, second, third, and fourth light sources 901, 1001, 1101, and 1201.

The first, second, third, and fourth collimator lenses 902, 1002, 1102, and 1202 convert light fluxes LA, LB, LC, and LD (first, second, third, and fourth light fluxes) emitted from the first to fourth light sources 901 to 1201 into parallel light fluxes. Here, the parallel light fluxes include not only strictly parallel light fluxes but also substantially parallel light fluxes such as weak divergent light fluxes and weak convergent light fluxes.

Each of the first, second, third, and fourth cylindrical lenses 903, 1003, 1103, and 1203 has a finite power (a refractive power) in a sub-scanning section. The light fluxes LA, LB, LC, and LD passed through the first to fourth collimator lenses 902 to 1202 are condensed in the sub-scanning direction by the first to fourth cylindrical lenses 903 to 1203.

The first, second, third, and fourth aperture stops 904, 1004, 1104, and 1204 control light flux diameters of the light fluxes LA to LD passed through the first to fourth cylindrical lenses 903 to 1203.

Thus, the light fluxes LA and LC emitted from the first and third light sources 901 and 1101 are condensed only in the sub-scanning direction in the vicinity of a first deflecting surface 905 of the deflecting unit 11, and are formed into linear images each being long in the main scanning direction.

In the meantime, the light fluxes LB and LD emitted from the second and fourth light sources 1001 and 1201 are condensed only in the sub-scanning direction in the vicinity of a second deflecting surface 1005 of the deflecting unit 11, and are formed into linear images each being long in the main scanning direction.

The deflecting unit 11 is rotated in a direction of an arrow A in FIG. 8A by a not-illustrated driving unit such as a motor, thus deflecting the light fluxes LA to LD incident on the deflecting unit 11. Here, the deflecting unit 11 is formed from a polygon mirror, for example.

Each of the first fθ lens 906 and the second fθ lens 907 is an anamorphic imaging lens having different powers in the main scanning section and in the sub-scanning section. Moreover, the first fθ lens 906 and the second fθ lens 907 condense (guide) the light flux LA deflected by the first deflecting surface 905 of the deflecting unit 11 onto the first scanned surface 908.

Meanwhile, each of the first fθ lens 1006 and the second fθ lens 1007 is an anamorphic imaging lens having different powers in the main scanning section and in the sub-scanning section. Moreover, the first fθ lens 1006 and the second fθ lens 1007 condense (guide) the light flux LB deflected by the second deflecting surface 1005 of the deflecting unit 11 onto the second scanned surface 1008.

On the other hand, each of the first fθ lens 1106 and the second fθ lens 1107 is an anamorphic imaging lens having different powers in the main scanning section and in the sub-scanning section. Moreover, the first fθ lens 1106 and the second fθ lens 1107 condense (guide) the light flux LC deflected by the first deflecting surface 905 of the deflecting unit 11 onto a third scanned surface 1108.

Meanwhile, each of the first fθ lens 1206 and the second fθ lens 1207 is an anamorphic imaging lens having different powers in the main scanning section and in the sub-scanning section. Moreover, the first fθ lens 1206 and the second fθ lens 1207 condense (guide) the light flux LD deflected by the second deflecting surface 1005 of the deflecting unit 11 onto a fourth scanned surface 1208.

The reflective members 909, 910, 1009, 1109, 1209, and 1210 are units for reflecting the light fluxes, which employ deposited mirrors and the like.

In the optical scanning apparatus 60 of this embodiment, the first incident optical system 75a is formed from the first collimator lens 902, the first cylindrical lens 903, and the first aperture stop 904. Moreover, the second incident optical system 75b is formed from the second collimator lens 1002, the second cylindrical lens 1003, and the second aperture stop 1004.

Meanwhile, a third incident optical system 75c is formed from the third collimator lens 1102, the third cylindrical lens 1103, and the third aperture stop 1104. Moreover, a fourth incident optical system 75d is formed from the fourth collimator lens 1202, the fourth cylindrical lens 1203, and the fourth aperture stop 1204.

In the meantime, in the optical scanning apparatus 60 of this embodiment, the first imaging optical system 85a is formed from the first fθ lens 906 and the second fθ lens 907. Moreover, the second imaging optical system 85b is formed from the first fθ lens 1006 and the second fθ lens 1007.

Meanwhile, a third imaging optical system 85c is formed from the first fθ lens 1106 and the second fθ lens 1107. Moreover, a fourth imaging optical system 85d is formed from the first fθ lens 1206 and the second fθ lens 1207.

In the meantime, in the optical scanning apparatus 60 of this embodiment, a first reflection optical system 95a is formed from the reflective members 909 and 910, and a second reflection optical system 95b is formed from the reflective member 1009.

Meanwhile, a third reflection optical system 95c is formed from the reflective member 1109, and a fourth reflection optical system 95d is formed from the reflective members 1209 and 1210.

In the optical scanning apparatus 60 of this embodiment, the optical axes of the first and second incident optical systems 75a and 75b in the sub-scanning section form angles of +3.0 degrees, respectively, with respect to the main scanning section.

Meanwhile, optical axes of the third and fourth incident optical systems 75c and 75d in the sub-scanning section form angles of −3.0 degrees, respectively, with respect to the main scanning section.

The light flux LA emitted from a light emitting point of the first light source 901 is converted into the parallel light flux by the first collimator lens 902.

Then, the converted light flux LA is condensed in the sub-scanning direction by the first cylindrical lens 903, passed through the first aperture stop 904, and obliquely incident on the first deflecting surface 905 of the deflecting unit 11 from an upper side in the sub-scanning direction.

Thereafter, the light flux LA emitted from the first light source 901 and incident on the first deflecting surface 905 of the deflecting unit 11 is subjected to deflection scanning by the deflecting unit 11 and is then condensed on the first scanned surface 908 by the first imaging optical system 85a, thus scanning the first scanned surface 908 at a uniform velocity.

The light flux LB emitted from a light emitting point of the second light source 1001 is converted into the parallel light flux by the second collimator lens 1002.

Then, the converted light flux LB is condensed in the sub-scanning direction by the second cylindrical lens 1003, passed through the second aperture stop 1004, and incident obliquely on the second deflecting surface 1005 of the deflecting unit 11 from an upper side in the sub-scanning direction.

Thereafter, the light flux LB emitted from the second light source 1001 and incident on the second deflecting surface 1005 of the deflecting unit 11 is subjected to deflection scanning by the deflecting unit 11 and is then condensed on the second scanned surface 1008 by the second imaging optical system 85b, thus scanning the second scanned surface 1008 at a uniform velocity.

The light flux LC emitted from a light emitting point of the third light source 1101 is converted into the parallel light flux by the third collimator lens 1102.

Then, the converted light flux LC is condensed in the sub-scanning direction by the third cylindrical lens 1103, passed through the third aperture stop 1104, and obliquely incident on the first deflecting surface 905 of the deflecting unit 11 from a lower side in the sub-scanning direction.

Thereafter, the light flux LC emitted from the third light source 1101 and incident on the first deflecting surface 905 of the deflecting unit 11 is subjected to deflection scanning by the deflecting unit 11 and is then condensed on the third scanned surface 1108 by the third imaging optical system 85c, thus scanning the third scanned surface 1108 at a uniform velocity.

The light flux LD emitted from a light emitting point of the fourth light source 1201 is converted into the parallel light flux by the fourth collimator lens 1202.

Then, the converted light flux LD is condensed in the sub-scanning direction by the fourth cylindrical lens 1203, passed through the fourth aperture stop 1204, and incident obliquely on the second deflecting surface 1005 of the deflecting unit 11 from a lower side in the sub-scanning direction.

The light flux LD emitted from the fourth light source 1201 and incident on the second deflecting surface 1005 of the deflecting unit 11 is subjected to deflection scanning by the deflecting unit 11 and is then condensed on the fourth scanned surface 1208 by the fourth imaging optical system 85d, thus scanning the fourth scanned surface 1208 at a uniform velocity.

Here, the deflecting unit 11 is rotated in the direction A in FIG. 8A. Accordingly, the light fluxes LA and LC subjected to the deflection scanning scan the first and third scanned surfaces 908 and 1108 in a direction B in FIG. 8A, respectively. Moreover, the light fluxes LB and LD subjected to the deflection scanning scan the second and fourth scanned surfaces 1008 and 1208 in a direction D in FIG. 8A, respectively.

Meanwhile, reference numeral F0 denotes a deflection point (an axial deflection point) on the first deflecting surface 905 of the deflecting unit 11 relative to the principal ray of the axial flux. In terms of the sub-scanning direction, the light fluxes LA and LC emitted from the first and third light sources 901 and 1101 cross each other at the deflection point F0. In the meantime, the deflection point F0 serves as a reference point of the first and third imaging optical systems 85a and 85c.

On the other hand, reference numeral G0 denotes a deflection point (an axial deflection point) on the second deflecting surface 1005 of the deflecting unit 11 relative to the principal ray of the axial flux. In terms of the sub-scanning direction, the light fluxes LB and LD emitted from the second and fourth light sources 1001 and 1201 cross each other at the deflection point G0. In the meantime, the deflection point G0 serves as a reference point of the second and fourth imaging optical systems 85b and 85d.

Note that first, second, third, and fourth photosensitive drums 908, 1008, 1108, and 1208 are used as the first, second, third, and fourth scanned surfaces 908, 1008, 1108, and 1208 in this embodiment.

Meanwhile, exposure distribution in the sub-scanning direction on the first to fourth photosensitive drums 908 to 1208 is formed by rotating the first to fourth photosensitive drums 908 to 1208 in the sub-scanning direction in each session of main scanning exposure.

Next, characteristics of the third and fourth incident optical systems 75c and 75d and the third and fourth imaging optical systems 85c and 85d of the optical scanning apparatus 60 of this embodiment will be listed in the following Tables 13 to 15.

Note that the characteristics of the first and second incident optical systems 75a and 75b and the first and second imaging optical systems 85a and 85b are the same as those of the optical scanning apparatus 50 according to the fifth embodiment listed in Tables 10 to 12. Accordingly, the duplicate listing will be omitted herein.

TABLE 13

| characteristics of light sources 1101 and 1201 | | |
|---|---|---|
| number of light emitting points | N (points) | 2 |
| rotation angles of light sources 1101 and 1201 | (deg) | 6.54 |
| array | (dimensions) | 1 |
| pitch | pitch (mm) | 0.09 |
| wavelength | λ (nm) | 790 |
| incident polarization to deflecting surfaces 905 and 1005 | | p polarization |
| full angle at half maximum in main scanning direction | FFPy (deg) | 12.00 |
| full angle at half maximum in sub-scanning direction | FFPz (deg) | 30.00 |

| forms of stops | | |
|---|---|---|
| | main scanning direction | sub-scanning direction |
| aperture stops 1104 and 1204 | 3.050 | 0.782 |

| refractive indices | | |
|---|---|---|
| collimator lenses 1102 and 1202 | N1 | 1.762 |
| cylindrical lenses 1103 and 1203 | N2 | 1.524 |

| forms of optical elements | | | |
|---|---|---|---|
| | | main scanning direction | sub-scanning direction |
| curvature radius of incident surfaces of collimator lenses 1102 and 1202 | r1a (mm) | ∞ | ∞ |
| curvature radius of exit surfaces of collimator lenses 1102 and 1202 | r1b (mm) | −15.216 | −15.216 |
| curvature radius of incident surfaces of cylindrical lenses 1103 and 1203 | r2a (mm) | ∞ | 41.028 |
| curvature radius of exit surfaces of cylindrical lenses 1103 and 1203 | r2b (mm) | ∞ | ∞ |

| focal lengths | | | |
|---|---|---|---|
| | | main scanning direction | sub-scanning direction |
| collimator lenses 1102 and 1202 | fcol (mm) | 19.98 | 19.98 |
| cylindrical lenses 1103 and 1203 | fcyl (mm) | ∞ | 78.30 |

| arrangement | | |
|---|---|---|
| light sources 1101 and 1201 to collimator lenses 1102 and 1202 | d0 (mm) | 18.79 |
| incident surfaces of collimator lenses 1102 and 1202 to exit surfaces of collimator lenses 1102 and 1202 | d1 (mm) | 2.40 |
| exit surfaces of collimator lenses 1102 and 1202 to incident surfaces of cylindrical lenses 1103 and 1203 | d2 (mm) | 20.06 |
| incident surfaces of cylindrical lenses 1103 and 1203 to exit surfaces of cylindrical lenses 1103 and 1203 | d3 (mm) | 3.00 |
| exit surfaces of cylindrical lenses 1103 and 1203 to aperture stops 1104 and 1204 | d4 (mm) | 36.67 |

TABLE 13-continued

| | | |
|---|---|---|
| aperture stops 1104 and 1204 to deflection points F0 and G0 | d5 (mm) | 40.33 |
| incident angle in main scanning section of light exited from aperture stop 1104 into first deflecting surface 905 | A1 (deg) | 90.00 |
| incident angle in main scanning section of light exited from aperture stop 1204 into second deflecting surface 1005 | A2 (deg) | 90.00 |
| incident angle in sub-scanning section of light exited from aperture stop 1104 into first deflecting surface 905 | A3 (deg) | −3.00 |
| incident angle in sub-scanning section of light exited from aperture stop 1204 into second deflecting surface 1005 | A4 (deg) | 3.00 |

TABLE 14

| fθ coefficient, scanning width, and angle of view | | | |
|---|---|---|---|
| fθ coefficient | k (mm/rad) | | 146 |
| scanning width | W (mm) | | 230 |
| maximum angle of view | θ (deg) | | 45.1 |
| refractive indices | | | |
| refractive index of first fθ lens 1106 | N5 | | 1.528 |
| refractive index of second fθ lens 1107 | N6 | | 1.528 |
| deflecting unit | | | |
| number of deflecting surfaces | | | 4 |
| circumradius | Rpol (mm) | | 10 |
| rotation center to deflection point F0 (optical axis direction) | Xpol (mm) | | 5.74 |
| rotation center to deflection point F0 (main scanning direction) | Ypol (mm) | | 4.26 |
| scanning optical system and arrangement | | | |
| deflection point F0 to incident surface of first fθ lens 1106 | d12 (mm) | | 17.00 |
| incident surface of first fθ lens 1106 to exit surface of first fθ lens 1106 | d13 (mm) | | 6.70 |
| exit surface of first fθ lens 1106 to incident surface of second fθ lens 1107 | d14 (mm) | | 56.30 |
| incident surface of second fθ lens 1107 to exit surface of second fθ lens 1107 | d15 (mm) | | 3.50 |
| exit surface of second fθ lens 1107 to third scanned surface 1108 | d16 (mm) | | 84.50 |
| deflection point F0 to incident surface of second fθ lens 1107 | L1 (mm) | | 80.00 |
| deflection point F0 to third scanned surface 1108 | T1 (mm) | | 168.00 |
| amount of sub-scanning eccentricity of second fθ lens 1107 | shiftZ (mm) | | 5.67 |
| sub-scanning magnification of third scanning optical system 85c | β | | 1.00 |

| shape of meridional line of first fθ lens 1106 | | |
|---|---|---|
| | incident surface counter-light source side | exit surface counter-light source side |
| R | −39.866 | −28.253 |
| ku | 2.065E+00 | 8.659E+05 |
| B4u | 9.292E−06 | −1.398E−05 |
| B6u | 3.110E−08 | 2.362E−08 |
| B8u | −1.025E−10 | −2.189E−11 |
| B10u | 1.310E−13 | −2.171E−14 |
| B12u | 0 | 0 |
| | light source side | light source side |
| kl | 2.065E+00 | 8.659E+05 |
| B4l | 9.292E−06 | −1.412E−05 |
| B6l | 3.110E−08 | 2.454E−08 |
| B8l | −1.025E−10 | −2.394E−11 |
| B10l | 1.310E−13 | −1.979E−14 |
| B12l | 0 | 0 |

TABLE 14-continued

| shape of sagittal line of first fθ lens 1106 | | |
|---|---|---|
| | incident surface change in sagittal radius | exit surface change in sagittal radius |
| r | 13.000 | 11.268 |
| E1 | 0 | 0.0001455 |
| E2 | 0 | −0.0001686 |
| E3 | 0 | 0 |
| E4 | 0 | −4.846E−07 |
| E5 | 0 | 0 |
| E6 | 0 | 1.156E−09 |
| E7 | 0 | 0 |
| E8 | 0 | 0 |
| E9 | 0 | 0 |
| E10 | 0 | 0 |
| | sagittal tilt | sagittal tilt |
| M0_1 | 0 | 0.03845 |
| M1_1 | 0 | −9.266E−06 |
| M2_1 | 0 | −8.686E−05 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

| shape of meridional line of second fθ lens 1107 | | |
|---|---|---|
| | incident surface counter-light source side | exit surface counter-light source side |
| R | −10000 | 228.410 |
| ku | 0 | −5.462E+01 |
| B4u | 0 | −5.399E−07 |
| B6u | 0 | 1.054E−10 |
| B8u | 0 | −1.701E−14 |
| B10u | 0 | 1.722E−18 |
| B12u | 0 | −7.826E−23 |
| | light source side | light source side |
| kl | 0 | −5.462E+01 |
| B4l | 0 | −5.411E−07 |
| B6l | 0 | 1.067E−10 |
| B8l | 0 | −1.777E−14 |
| B10l | 0 | 1.890E−18 |
| B12l | 0 | −9.085E−23 |

TABLE 14-continued shape of sagittal line of second fθ lens 1107

| | incident surface change in sagittal radius | exit surface change in sagittal radius |
|---|---|---|
| r | 60.676 | −31.725 |
| E1 | 0 | 2.169E−04 |
| E2 | 0.0004470 | 3.483E−05 |
| E3 | 0 | 0 |
| E4 | −4.827E−08 | 5.550E−09 |
| E5 | 0 | 0 |
| E6 | −2.372E−12 | −3.405E−12 |
| E7 | 0 | 0 |
| E8 | 2.304E−15 | 2.138E−16 |
| E9 | 0 | 0 |
| E10 | 0 | 0 |

| | sagittal tilt | sagittal tilt |
|---|---|---|
| M0_1 | 0.09462 | −0.08550 |
| M1_1 | 0.0003547 | 0.0003581 |
| M2_1 | 2.849E−06 | 3.393E−05 |
| M3_1 | −5.463E−08 | −7.297E−08 |
| M4_1 | 1.278E−09 | −9.985E−09 |
| M5_1 | 2.873E−12 | 1.851E−11 |
| M6_1 | −1.077E−12 | 2.695E−12 |
| M7_1 | 2.305E−15 | −1.912E−15 |
| M8_1 | −2.333E−16 | −7.635E−16 |
| M9_1 | −1.496E−19 | 2.569E−19 |
| M10_1 | 2.586E−20 | 4.568E−20 |
| M11_1 | 0 | 0 |
| M12_1 | 0 | 0 |

TABLE 15 fθ coefficient, scanning width, and angle of view

| | | |
|---|---|---|
| fθ coefficient | k (mm/rad) | 146 |
| scanning width | W (mm) | 230 |
| maximum angle of view | θ (deg) | 45.1 | refractive indices

| | | |
|---|---|---|
| refractive index of first fθ lens 1206 | N5 | 1.528 |
| refractive index of second fθ lens 1207 | N6 | 1.528 | deflecting unit

| | | |
|---|---|---|
| number of deflecting surfaces | | 4 |
| circumradius | Rpol (mm) | 10 |
| rotation center to deflection point G0 (optical axis direction) | Xpol (mm) | 5.74 |
| rotation center to deflection point G0 (main scanning direction) | Ypol (mm) | 4.26 | scanning optical system and arrangement

| | | |
|---|---|---|
| deflection point G0 to incident surface of first fθ lens 1206 | d12 (mm) | 17.00 |
| incident surface of first fθ lens 1206 to exit surface of first fθ lens 1206 | d13 (mm) | 6.70 |
| exit surface of first fθ lens 1206 to incident surface of second fθ lens 1207 | d14 (mm) | 72.30 |
| incident surface of second fθ lens 1207 to exit surface of second fθ lens 1207 | d15 (mm) | 3.50 |
| exit surface of second fθ lens 1207 to fourth scanned surface 1208 | d16 (mm) | 68.50 |
| deflection point G0 to incident surface of second fθ lens 1207 | L1 (mm) | 96.00 |
| deflection point G0 to fourth scanned surface 1208 | T1 (mm) | 168.00 |
| amount of sub-scanning eccentricity of second fθ lens 1207 | shiftZ (mm) | 6.86 |
| sub-scanning magnification of fourth scanning optical system 85d | β | 1.00 |

TABLE 15-continued shape of meridional line of first fθ lens 1206

| | incident surface counter-light source side | exit surface counter-light source side |
|---|---|---|
| R | −49.912 | −33.570 |
| ku | 3.517E+00 | 8.385E+04 |
| B4u | 8.144E−06 | −1.046E−05 |
| B6u | 1.731E−08 | 1.703E−08 |
| B8u | −6.571E−11 | −2.092E−11 |
| B10u | 8.472E−14 | −8.007E−15 |
| B12u | 0 | 0 |

| | light source side | light source side |
|---|---|---|
| kl | 3.517E+00 | 8.385E+04 |
| B4l | 8.144E−06 | −1.050E−05 |
| B6l | 1.731E−08 | 1.749E−08 |
| B8l | −6.571E−11 | −2.257E−11 |
| B10l | 8.472E−14 | −6.096E−15 |
| B12l | 0 | 0 | shape of sagittal line of first fθ lens 1206

| | incident surface change in sagittal radius | exit surface change in sagittal radius |
|---|---|---|
| r | 13.000 | 22.244 |
| E1 | 0 | −0.0001642 |
| E2 | 0 | −0.001204 |
| E3 | 0 | 0 |
| E4 | 0 | 1.538E−06 |
| E5 | 0 | 0 |
| E6 | 0 | −9.773E−10 |
| E7 | 0 | 0 |
| E8 | 0 | 0 |
| E9 | 0 | 0 |
| E10 | 0 | 0 |

| | sagittal tilt | sagittal tilt |
|---|---|---|
| M0_1 | 0 | −0.0810 |
| M1_1 | 0 | 1.262E−06 |
| M2_1 | 0 | 9.130E−05 |
| M3_1 | 0 | 9.910E−08 |
| M4_1 | 0 | −1.107E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 1207

| | incident surface counter-light source side | exit surface counter-light source side |
|---|---|---|
| R | −10000 | 279.878 |
| ku | 0 | −5.367E+01 |
| B4u | 0 | −3.311E−07 |
| B6u | 0 | 4.279E−11 |
| B8u | 0 | −4.922E−15 |
| B10u | 0 | 3.461E−19 |
| B12u | 0 | −1.034E−23 |

| | light source side | light source side |
|---|---|---|
| kl | 0 | −5.367E+01 |
| B4l | 0 | −3.335E−07 |
| B6l | 0 | 4.318E−11 |
| B8l | 0 | −4.880E−15 |
| B10l | 0 | 3.327E−19 |
| B12l | 0 | −9.723E−24 |

TABLE 15-continued shape of sagittal line of second fθ lens 1207

| | incident surface change in sagittal radius | exit surface change in sagittal radius |
|---|---|---|
| r | 22.604 | −1000.000 |
| E1 | 9.474E−05 | 0.000E+00 |
| E2 | 8.693E−05 | 0.000E+00 |
| E3 | 0 | 0 |
| E4 | −4.848E−09 | 0.000E+00 |
| E5 | 0 | 0 |
| E6 | 1.645E−13 | 0.000E+00 |
| E7 | 0 | 0 |
| E8 | −2.038E−17 | 0.000E+00 |
| E9 | 0 | 0 |
| E10 | 0 | 0 |

| | sagittal tilt | sagittal tilt |
|---|---|---|
| M0_1 | −0.1683 | 0.0274 |
| M1_1 | −0.0002480 | −0.0002605 |
| M2_1 | 6.372E−06 | −1.325E−05 |
| M3_1 | 4.718E−08 | 4.429E−08 |
| M4_1 | −2.700E−09 | 5.426E−10 |
| M5_1 | −5.354E−28 | 2.061E−28 |
| M6_1 | 3.256E−14 | −3.757E−13 |
| M7_1 | 8.193E−16 | 3.438E−16 |
| M8_1 | 1.575E−16 | 1.071E−16 |
| M9_1 | −2.174E−20 | 6.387E−20 |
| M10_1 | −3.849E−21 | 6.178E−21 |
| M11_1 | 0 | 0 |
| M12_1 | 0 | 0 |

Note that in Tables 13 to 15, the direction of the optical axis, the axis orthogonal to the optical axis in the main scanning section, and the axis orthogonal to the optical axis in the sub-scanning section in the case where the intersection point of each lens surface and the optical axis is determined as the point of origin are defined as the x axis, the y axis, and the z axis, respectively. In addition, in Tables 14 and 15, the expression "E-x" means "×10$^{-x}$".

The aspheric surface shape (the meridional shape) in the main scanning section of each of lens surfaces of the first fθ lenses 906, 1006, 1106, and 1206 and the second fθ lenses 907, 1007, 1107, and 1207 of the optical scanning apparatus 60 of this embodiment is defined by the above-described expression (1).

Meanwhile, the aspheric surface shape (the sagittal shape) in the sub-scanning section of each of the lens surfaces of the first fθ lenses 906, 1006, 1106, and 1206 and the second fθ lenses 907, 1007, 1107, and 1207 is defined by the above-described expression (2).

Note that the amount of sagittal tilt in this embodiment corresponds to the value $M_{01}$. Accordingly, the sagittal tilt surface corresponds to a surface having the value of $M_{01}$ not equal to 0, and the sagittal tilt variable surface corresponds to a surface having at least one of values $M_{j1}$ (j=1 to 12) not equal to 0.

In the meantime, the curvature radius r' in the sub-scanning section continuously varies in accordance with the y coordinate of the lens surface as defined in the above-described expression (3).

As shown in FIG. 7, in the optical scanning apparatus 60 of this embodiment, the second fθ lenses 907 and 1007 include the image-side principal planes 950 and 1050, respectively.

Moreover, the image-side principal planes 950 and 1050 are located away by the distances $ok_1$ and $ok_2$ from positions of passage of the axial rays on the exit surfaces of the second fθ lenses 907 and 1007, respectively.

In the meantime, in the optical scanning apparatus 60 of this embodiment, the second fθ lenses 1107 and 1207 include image-side principal planes 1150 and 1250, respectively (not shown).

Moreover, the image-side principal planes 1150 and 1250 are located away by distances $ok_3$ and $ok_4$ from positions of passage of the axial rays on the exit surfaces of the second fθ lenses 1107 and 1207, respectively.

Here, assuming that the refractive index, the center thickness, and the refractive power of the second fθ lens 907 are defined as $N_1$, $d_1$, and $\phi_1$, respectively, and that the refractive power of the incident surface of the second fθ lens 907 is defined as $\phi_{11}$, the distance $ok_1$ is obtained from the above-described expression (4).

Meanwhile, assuming that the refractive index, the center thickness, and the refractive power of the second fθ lens 1007 are defined as $N_2$, $d_2$, and $\phi_2$, respectively, and that the refractive power of the incident surface of the second fθ lens 1007 is defined as $\phi_{21}$, the distance $ok_2$ is obtained from the above-described expression (5).

In the meantime, assuming that a refractive index, a center thickness, and a refractive power of the second fθ lens 1107 are defined as $N_3$, $d_3$, and $\phi_3$, respectively, and that a refractive power of the incident surface of the second fθ lens 1107 is defined as $\phi_{31}$, the distance $ok_3$ is obtained from the following expression (7):

$$ok_3 = -\frac{d_3}{N_3}\frac{\phi_{31}}{\phi_3}. \qquad (7)$$

Meanwhile, assuming that a refractive index, a center thickness, and a refractive power of the second fθ lens 1207 are defined as $N_4$, $d_4$, and $\phi_4$, respectively, and that a refractive power of the incident surface of the second fθ lens 1207 is defined as $\phi_{41}$, the distance $ok_4$ is obtained from the following expression (8):

$$ok_4 = -\frac{d_4}{N_4}\frac{\phi_{41}}{\phi_4}. \qquad (8)$$

In the optical scanning apparatus 60 of this embodiment, the values of $ok_1$ and $ok_2$ turn out to be −0.797 mm and −2.242 mm, respectively, in accordance with the above-described expressions (4) and (5).

Likewise, the values of $ok_3$ and $ok_4$ turn out to be −0.797 mm and −2.242 mm, respectively, in accordance with the above-described expressions (7) and (8). As a consequence, $ok_1=ok_3$ and $ok_2=ok_4$ are satisfied.

Accordingly, the optical scanning apparatus 60 of this embodiment satisfies $ok_2<ok_1$.

As a consequence, even when the distance on the optical path from the deflection point F0 to the incident surface of the second fθ lens 907 is different from the distance on the optical path from the deflection point G0 to the incident surface of the second fθ lens 1007, it is possible to reduce a difference between a distance on an optical path from the deflection point F0 to the image-side principal plane 950 and a distance on an optical path from the deflection point G0 to the image-side principal plane 1050.

Likewise, the optical scanning apparatus 60 of this embodiment satisfies $ok_4<ok_3$.

As a consequence, even when the distance on an optical path from the deflection point F0 to the incident surface of the second fθ lens 1107 is different from the distance on an optical path from the deflection point G0 to the incident surface of the second fθ lens 1207, it is possible to reduce a difference between a distance on the optical path from the deflection point F0 to the image-side principal plane 1150 and a distance on the optical path from the deflection point G0 to the image-side principal plane 1250.

Moreover, in addition to the second fθ lenses 907 and 1007, it is also preferable to equalize ratios of the refractive index to the center thickness between the second fθ lenses 1107 and 1207 in light of the reduction in size of the apparatus.

For this reason, it is more preferable that the optical scanning apparatus 60 of this embodiment satisfy the following expression (9):

$$\frac{\phi_{31}}{\phi_3} < \frac{\phi_{41}}{\phi_4}. \tag{9}$$

In the optical scanning apparatus 60 of this embodiment, the values of $\phi_{11}$ and $\phi_1$ turn out to be 0.0087 and 0.0250, respectively, while the values of $\phi_{21}$ and $\phi_2$ turn out to be 0.0234 and 0.0239, respectively. Thus, the expression (6) is satisfied.

Meanwhile, in the optical scanning apparatus 60 of this embodiment, the values of $\phi_{31}$ and $\phi_3$ turn out to be 0.0087 and 0.0250, respectively, while the values of $\phi_{41}$ and $\phi_4$ turn out to be 0.0234 and 0.0239, respectively. Thus, the expression (9) is satisfied.

In the meantime, as shown in FIG. 7, the first and second imaging optical systems 85a and 85b of the optical scanning apparatus 60 of this embodiment include the image-side principal planes 951 and 1051, respectively.

Moreover, in order to reduce the difference in sub-scanning magnification between the first and second imaging optical systems 85a and 85b, the first fθ lenses 906 and 1006 of the optical scanning apparatus 60 of this embodiment also have refractive powers in the sub-scanning section (including the optical axis).

Likewise, the third and fourth imaging optical systems 85c and 85d of the optical scanning apparatus 60 of this embodiment include image-side principal planes 1151 and 1251 (not shown), respectively.

Moreover, in order to reduce the difference in sub-scanning magnification between the third and fourth imaging optical systems 85c and 85d, the first fθ lenses 1106 and 1206 of the optical scanning apparatus 60 of this embodiment also have refractive powers in the sub-scanning section (including the optical axis).

In the optical scanning apparatus 60 of this embodiment, the second fθ lens 907 is located closer to the deflecting unit 11 than the second fθ lens 1007.

Accordingly, in order to reduce the difference between the distance on the optical path from the deflection point F0 to the image-side principal plane 951 of the first imaging optical system 85a and the distance on the optical path from the deflection point G0 to the image-side principal plane 1051 of the second imaging optical system 85b, it is necessary to set the refractive power of the first fθ lens 906 lower than the refractive power of the first fθ lens 1006.

Likewise, in the optical scanning apparatus 60 of this embodiment, the second fθ lens 1107 is located closer to the deflecting unit 11 than the second fθ lens 1207.

Accordingly, in order to reduce the difference between the distance on the optical path from the deflection point F0 to the image-side principal plane 1151 of the third imaging optical system 85c and the distance on the optical path from the deflection point G0 to the image-side principal plane 1251 of the fourth imaging optical system 85d, it is necessary to set the refractive power of the first fθ lens 1106 lower than the refractive power of the first fθ lens 1206.

Here, assuming that the refractive power of the first fθ lens 906 is $\phi_5$ and the refractive power of the first fθ lens 1006 is $\phi_6$, the optical scanning apparatus 60 of this embodiment brings about $\phi_5$=0.0021 and $\phi_6$=0.0211.

In other words, the refractive power $\phi_5$ of the first fθ lens 906 is lower than the refractive power $\phi_6$ of the first fθ lens 1006.

Meanwhile, assuming that the refractive power of the first fθ lens 1106 is $\phi_7$ and the refractive power of the first fθ lens 1206 is $\phi_8$, the optical scanning apparatus 60 of this embodiment brings about $\phi_7$=0.0021 and $\phi_8$=0.0211.

In other words, the refractive power $\phi_7$ of the first fθ lens 1106 is lower than the refractive power $\phi_8$ of the first fθ lens 1206.

As a consequence, in the optical scanning apparatus 60 of this embodiment, magnifications in the sub-scanning direction of the first to fourth imaging optical systems 85a to 85d can be adjusted to −1.0 and the difference among the magnifications is substantially equal to 0.

Hence, it is possible to reduce the differences in Fno values among the first to fourth imaging optical systems 85a to 85d by reducing the differences in sub-scanning magnification among the first to fourth imaging optical systems 85a to 85d.

In this way, it is possible to reduce the differences in amount of light among the irradiating light beams that irradiate the first to fourth scanned surfaces 908 to 1208, respectively.

Meanwhile, when the curvature radii in the sub-scanning section including the optical axis of the incident surface and the exit surface of the second fθ lens 907 are defined as $R_{11}$ and $R_{12}$, respectively, the values $|R_{11}|$ and $|R_{12}|$ turn out to be 60.68 and 31.72 in the optical scanning apparatus 60 of this embodiment.

In the meantime, when the curvature radii in the sub-scanning section including the optical axis of the incident surface and the exit surface of the second fθ lens 1007 are defined as $R_{21}$ and $R_{22}$, respectively, the values of $|R_{21}|$ and $|R_{22}|$ turn out to be 22.60 and 1000 in the optical scanning apparatus 60 of this embodiment.

The optical scanning apparatus 60 of this embodiment satisfies the relations of $|R_{11}|>|R_{12}|$ and $|R_{21}|<|R_{22}|$, which represent a desirable configuration for increasing the distance between the second fθ lenses 907 and 1007, or in other words, for locating the second fθ lenses 907 and 1007 away from each other.

Likewise, when curvature radii in the sub-scanning section including the optical axis of the incident surface and the exit surface of the second fθ lens 1107 are defined as R31 and R32, respectively, values of $|R_{31}|$ and $|R_{32}|$ turn out to be 60.68 and 31.72 in the optical scanning apparatus 60 of this embodiment.

In the meantime, when curvature radii in the sub-scanning section including the optical axis of the incident surface and the exit surface of the second fθ lens 1207 are defined as $R_{41}$ and $R_{42}$, respectively, values of $|R_{41}|$ and $|R_{41}|$ turn out to be 22.60 and 1000 in the optical scanning apparatus 60 of this embodiment.

The optical scanning apparatus 60 of this embodiment satisfies relations of $|R_{31}|>|R_{32}|$ and $|R_{41}|<|R_{42}|$, which represent a desirable configuration for increasing the distance between the second fθ lenses 1107 and 1207, or in other words, for locating the second fθ lenses 1107 and 1207 away from each other.

Next, characteristics of the first fθ lenses 906, 1006, 1106, and 1206 and the second fθ lenses 907, 1007, 1107, and 1207 of the optical scanning apparatus 60 of this embodiment will be listed in the following Table 16.

Moreover, in order to properly correct the displacements of the irradiation positions on the first to fourth scanned surfaces 908 to 1208, it is more preferable to set the amount of sagittal tilt of the incident surface of each of the second fθ lenses 1007 and 1207 larger than the amount of sagittal tilt of the incident surface of each of the second fθ lenses 907 and 1107.

TABLE 16

|  | first fθ lenses 906 and 1106 | | | second fθ lenses 907 and 1107 | | | first fθ lenses 1006 and 1206 | | | second fθ lenses 1007 and 1207 | | |
| --- | --- | --- | --- | --- | --- | --- | --- | --- | --- | --- | --- | --- |
|  | incident surface | exit surface | entire system | incident surface | exit surface | entire system | incident surface | exit surface | entire system | incident surface | exit surface | entire system |
| refractive index |  | 1.528 |  |  | 1.528 |  |  | 1.528 |  |  | 1.528 |  |
| lens thickness |  | 6.7 |  |  | 3.5 |  |  | 6.7 |  |  | 3.5 |  |
| curvature radius | 13 | 11.268 | — | 60.676 | −31.725 | — | 13 | 22.244 | — | 22.604 | −1000.00 | — |
| refractive power | 0.0406 | −0.0469 | 0.0021 | 0.0087 | 0.0166 | 0.0250 | 0.0406 | −0.0237 | 0.0211 | 0.0234 | 0.0005 | 0.0239 |
| absolute value of amount of sagittal tilt (|M0_1|) | 0 | 0.0384 | — | 0.0946 | 0.0855 | — | 0 | 0.0810 | — | 0.1683 | −0.0274 | — |
| focal length | 24.621 | −21.340 | 475.940 | 114.917 | 60.085 | 39.979 | 24.621 | −42.128 | 47.381 | 42.811 | 1893.939 | 41.914 |

As described above, in the optical scanning apparatus 60 of this embodiment, the exit surface of each of the first fθ lenses 906, 1006, 1106, and 1206 is formed into the sagittal tilt surface in order to avoid interferences among optical components associated with reduction in size.

Here, in order to coordinate exiting angles in the sub-scanning section of the light fluxes LA, LB, LC, and LD exited from the first fθ lenses 906, 1006, 1106, and 1206, respectively, it is preferable to set the amount of sagittal tilt of the exit surface of each of the first fθ lenses 906 and 1106, which has the refractive power in the sub-scanning section (including the optical axis) lower than that of the first fθ lenses 1006 and 1206, smaller than the amount of sagittal tilt of the exit surface of each of the first fθ lenses 1006 and 1206.

Assuming that the amount of sagittal tilt of the exit surface of each of the first fθ lenses 906 and 1106 is $Ts_{11}$ and the amount of sagittal tilt of the exit surface of each of the first fθ lenses 1006 and 1206 is $Ts_{12}$, the optical scanning apparatus 60 of this embodiment brings about $|Ts_{11}|=0.0384$ and $|Ts_{12}|=0.0810$.

As described above, in the optical scanning apparatus 60 of this embodiment, the amount of sagittal tilt of the exit surface of each of the first fθ lenses 906 and 1106, which has the refractive power in the sub-scanning section (including the optical axis) lower than that of the first fθ lenses 1006 and 1206, is smaller than the amount of sagittal tilt of the exit surface of each of the first fθ lenses 1006 and 1206.

In the meantime, increases in amount of sagittal tilt of the exit surfaces of the first fθ lenses 1006 and 1206 lead to deteriorations associated with displacements of irradiation positions on the second and fourth scanned surfaces 1008 and 1208 from nominal positions.

Accordingly, in order to properly correct the displacements of the irradiation positions on the first to fourth scanned surfaces 908 to 1208, it is preferable to set the amount of sagittal tilt of the incident surface or the exit surface of each of the second fθ lenses 1007 and 1207 larger than the amount of sagittal tilt of the incident surface or the exit surface of each of the second fθ lenses 907 and 1107.

Assuming that the amount of sagittal tilt of the incident surface of each of the second fθ lenses 907 and 1107 is $Ts_{21}$ and the amount of sagittal tilt of the incident surface of each of the second fθ lenses 1007 and 1207 is $Ts_{22}$, the optical scanning apparatus 60 of this embodiment brings about $|Ts_{21}|=0.0946$ and $|Ts_{22}|=0.1683$.

Meanwhile, in the optical scanning apparatus 60 of this embodiment, the amount of sagittal tilt of the incident surface of each of the second fθ lenses 907, 1007, 1107, and 1207 is set larger than the amount of sagittal tilt of the exit surface thereof.

Specifically, assuming that the amount of sagittal tilt of the exit surface of each of the second fθ lenses 907 and 1107 is $Ts_{31}$ and the amount of sagittal tilt of the exit surface of each of the second fθ lenses 1007 and 1207 is $Ts_{32}$, the optical scanning apparatus 60 brings about $|Ts_{31}|=0.0855$ ($<|Ts_{21}|$) and $|Ts_{32}|=0.0274$ ($<|Ts_{22}|$).

Figure 10A:
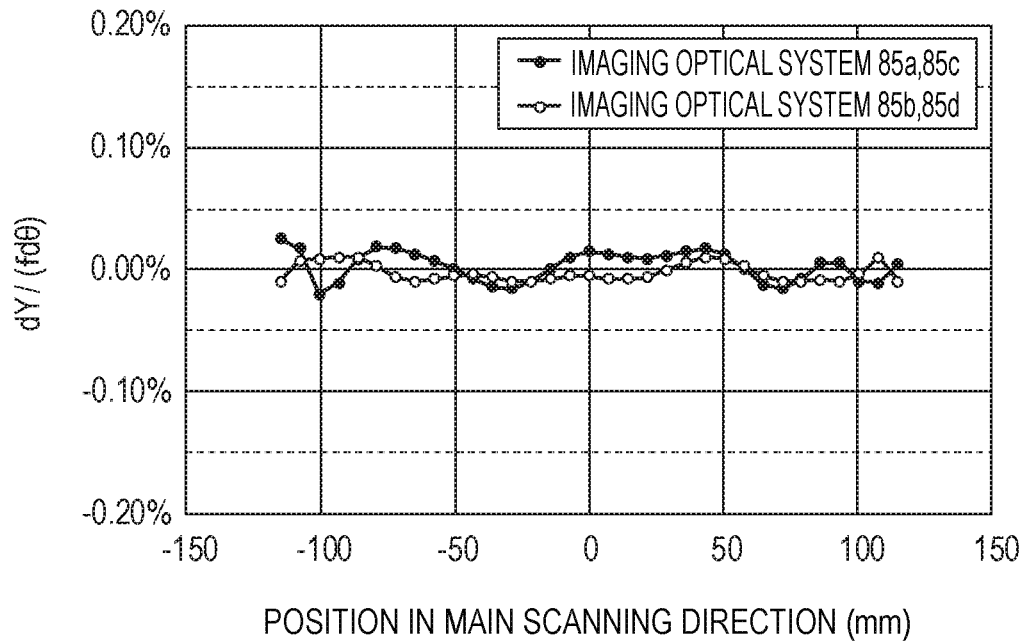
FIG. 10A is a graph showing partial magnifications of the respective imaging optical systems included in the optical scanning apparatus according to the sixth embodiment.
Figure 10B:
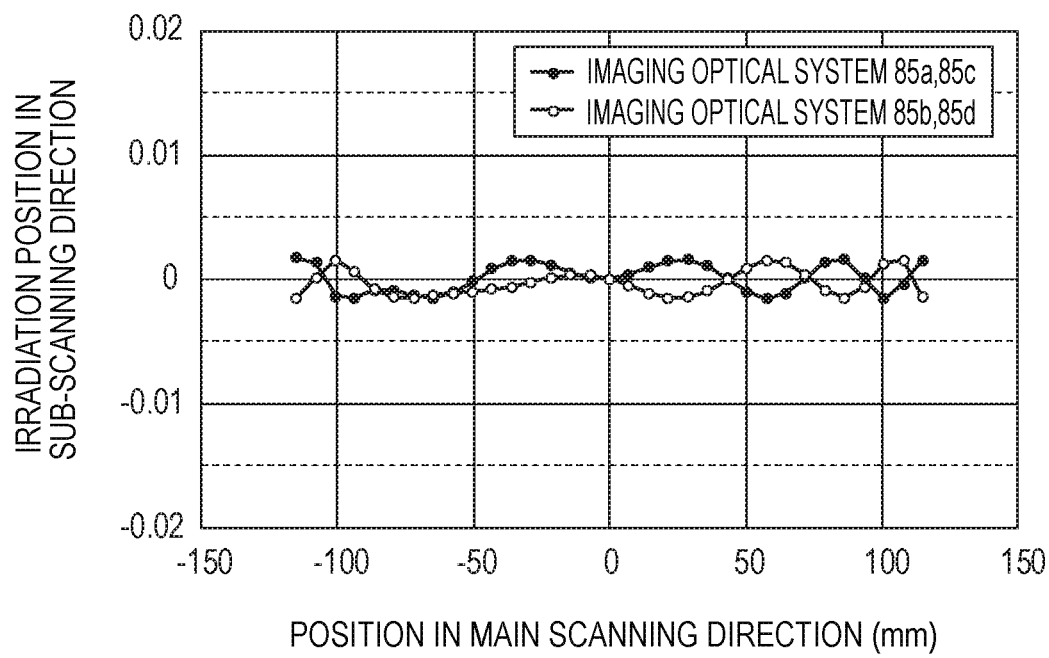
FIG. 10B is a graph showing displacements of irradiation positions on respective scanned surfaces with the optical scanning apparatus according to the sixth embodiment.

FIGS. 10A and 10B show partial magnifications dY/(fdθ) of the first to fourth imaging optical systems 85a to 85d at various image heights, and displacements of the irradiation positions on the first to fourth scanned surfaces 908 to 1208 in the sub-scanning direction from the nominal positions, respectively.

As shown in FIG. 10A, the optical scanning apparatus 60 of this embodiment successfully suppresses the partial magnifications dY/(fdθ) of the first to fourth imaging optical systems 85a to 85d, which correspond to the displacements of the irradiation positions in the main scanning direction from the nominal positions, within a range of ±0.05%.

Meanwhile, as shown in FIG. 10B, the optical scanning apparatus 60 of this embodiment successfully suppresses a scanning line curvature, which corresponds to the displacement of the irradiation position in the sub-scanning direction from the nominal position, within a range of ±2.5 μm for each of the first to fourth scanned surfaces 908 to 1208.

Thus, in the optical scanning apparatus 60 of this embodiment, the first fθ lenses 906 to 1206 and the second fθ lenses 907 and 1207 are configured as described above. Accordingly, it is possible to provide the optical scanning apparatus being small in size while reducing the difference in amount of light among the first to fourth scanned surfaces 908 to 1208, namely, among colors.

While the preferred embodiments of the present invention have been described above, it is to be understood that the invention is not limited only to these embodiments but various modifications and changes are possible within the scope of the invention.

[Image Forming Apparatus]

Figure 11:
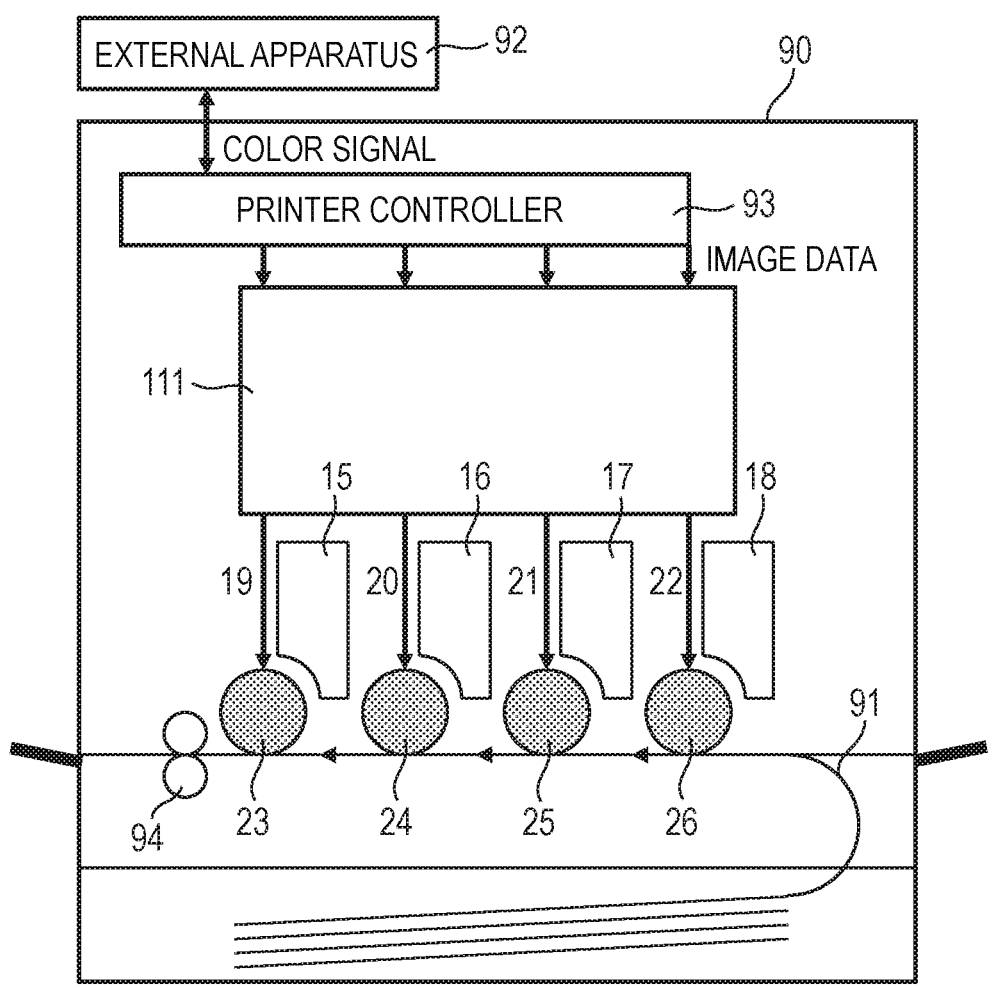
FIG. 11 is a sub-scanning sectional view showing a substantial part of a color image forming apparatus according to an embodiment.

FIG. 11 shows a sub-scanning sectional view of a substantial part of a color image forming apparatus 90 that mounts an optical scanning apparatus 111 according to the sixth embodiment.

The image forming apparatus 90 is a color image forming apparatus of a tandem type, which is configured to record image information on respective photosensitive drums that serve as image carriers by using the optical scanning apparatus 111 according to the sixth embodiment.

The image forming apparatus 90 includes the optical scanning apparatus 111 according to the sixth embodiment, photosensitive drums (photosensitive bodies) 23, 24, 25, and 26 serving as the image carriers, and developing units 15, 16, 17, and 18. Moreover, the image forming apparatus 90 includes a conveyance belt 91, a printer controller 93, and a fixing unit 94.

Signals (code data) of respective colors of R (red), G (green), and B (blue) outputted from an external apparatus 92 such as a personal computer are inputted to the image forming apparatus 90.

The inputted color signals are converted into respective image data (dot data) of C (cyan), M (magenta), Y (yellow), and K (black) by the printer controller 93 in the image forming apparatus 90.

The converted image data are inputted to the optical scanning apparatus 111, respectively. Then, light beams 19, 20, 21, and 22 modulated in accordance with the respective image data are emitted from the optical scanning apparatus 111, respectively, and photosensitive surfaces of the photosensitive drums 23, 24, 25, and 26 are exposed to these light beams.

Charging rollers (not shown) configured to uniformly charge surfaces of the photosensitive drums 23, 24, 25, and 26 are provided in contact with the respective surfaces thereof. Moreover, the optical scanning apparatus 111 irradiates the surfaces of the photosensitive drums 23, 24, 25, and 26, which are charged by the charging rollers, with the light beams 19, 20, 21, and 22.

As mentioned above, the light beams 19, 20, 21, and 22 are modulated in accordance with the image data of the respective colors, and electrostatic latent images are formed on the surfaces of the photosensitive drums 23, 24, 25, and 26 as a consequence of irradiation with the light beams 19, 20, 21, and 22. The electrostatic latent images thus formed are developed into toner images by the developing units 15, 16, 17, and 18 which are arranged in contact with the photosensitive drums 23, 24, 25, and 26.

The toner images developed by the developing units 15 to 18 are subjected to multiple transfer by means of not-illustrated transferring rollers (transferring units) arranged so as to face on the photosensitive drums 23 to 26 onto a not-illustrated sheet (a transferred material) that is conveyed on the conveyance belt 91, whereby a single full-color image is produced thereon.

The sheet to which the unfixed toner images are transferred as described above is further conveyed to the fixing unit 94 located downstream of the photosensitive drums 23, 24, 25, and 26 (on the left side in FIG. 11). The fixing unit 94 includes a fixing roller having a built-in fixing heater (not shown), and a pressure roller arranged in pressure-contact with this fixing roller. The sheet conveyed from the transferring units is pressed and heated by pressure-contact parts of the fixing roller and the pressure roller, whereby the unfixed toner images on the sheet are fixed. Moreover, a not-illustrated sheet discharging roller is arranged behind the fixing roller. The sheet discharging roller discharges the fixed sheet out of the image forming apparatus 90.

The color image forming apparatus 90 is configured to record image signals (image information) on the photosensitive surfaces of the photosensitive drums 23, 24, 25, and 26 that correspond to the respective colors of C, M, Y, and K by using the optical scanning apparatus 111, thereby printing a color image at a high speed.

A color image reading apparatus provided with a CCD sensor may be used as the external apparatus 92, for example. In this case, the color image reading apparatus and the color image forming apparatus 90 collectively constitute a color digital copier.

In the meantime, the color image forming apparatus 90 may adopt a pair of the optical scanning apparatuses according to any one of the first to fifth embodiments instead of the optical scanning apparatus 111 of the sixth embodiment.

According to the present invention, it is possible to provide an optical scanning apparatus which is capable of achieving reduction in size while reducing a difference in amount of light among scanned surfaces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-154097, filed Aug. 20, 2018, which is hereby incorporated by reference herein in its entirety.

What is claimed is:

1. An optical scanning apparatus comprising:
   first and second deflecting units configured to scan first and second scanned surfaces in a main scanning direction by deflecting first and second light fluxes, respectively; and
   first and second imaging optical systems configured to guide the first and second light fluxes deflected by the first and second deflecting units to the first and second scanned surfaces, respectively, wherein
   the first and second imaging optical systems include first and second imaging elements, respectively, each imaging element having the largest refractive power in a sub-scanning section including an optical axis in the corresponding one of the first and second imaging optical systems,
   a distance on an optical path from an axial deflection point on a deflecting surface of the first deflecting unit to the first imaging element is shorter than a distance on an optical path from an axial deflection point on a deflecting surface of the second deflecting unit to the second imaging element, and
   a following condition is satisfied:

$$-\frac{d_2}{N_2}\frac{\phi_{21}}{\phi_2} < -\frac{d_1}{N_1}\frac{\phi_{11}}{\phi_1},$$

where $N_1$, $d_1$, $\phi_1$, and $\phi_{11}$ represent a refractive index, a thickness on the optical axis, a refractive power in the sub-scanning section, and a refractive power in the sub-scanning section of an incident surface, of the first imaging element, respectively, and $N_2$, $d_2$, $\phi_2$, and $\phi_{21}$ represent a refractive index, a thickness on the optical axis, a refractive power in the sub-scanning section, and a refractive power in the sub-scanning section of an incident surface, of the second imaging element, respectively.

2. The optical scanning apparatus according to claim 1, wherein the first and second light fluxes are incident perpendicularly on the deflecting surfaces of the first and second deflecting units in the sub-scanning section, respectively.

3. An optical scanning apparatus comprising:
a deflecting unit configured to scan first and second scanned surfaces in a main scanning direction by deflecting first and second light fluxes; and
first and second imaging optical systems configured to guide the first and second light fluxes deflected by the deflecting unit to the first and second scanned surfaces, respectively, wherein
in a sub-scanning section, the first and second light fluxes are incident on a first deflecting surface of the deflecting unit at different angles from each other with respect to a main scanning section,
the first and second imaging optical systems include first and second imaging elements, respectively, each imaging element having the largest refractive power in the sub-scanning section including an optical axis in the corresponding one of the first and second imaging optical systems,
a distance on an optical path from an axial deflection point on the first deflecting surface to the first imaging element is shorter than a distance on an optical path from the axial deflection point on the first deflecting surface to the second imaging element, and
a following condition is satisfied:

$$-\frac{d_2}{N_2}\frac{\phi_{21}}{\phi_2} < -\frac{d_1}{N_1}\frac{\phi_{11}}{\phi_1},$$

where $N_1$, $d_1$, $\phi_1$, and $\phi_{11}$ represent a refractive index, a thickness on the optical axis, a refractive power in the sub-scanning section, and a refractive power in the sub-scanning section of an incident surface, of the first imaging element, respectively, and $N_2$, $d_2$, $\phi_2$, and $\phi_{21}$ represent a refractive index, a thickness on the optical axis, a refractive power in the sub-scanning section, and a refractive power in the sub-scanning section of an incident surface, of the second imaging element, respectively.

4. The optical scanning apparatus according to claim 3, further comprising:
third and fourth imaging optical systems configured to guide third and fourth light fluxes deflected by the deflecting unit to third and fourth scanned surfaces, respectively, wherein
the deflecting unit scans the third and fourth scanned surfaces in the main scanning direction by deflecting the third and fourth fluxes, respectively,
in the sub-scanning section, the third and fourth light fluxes are incident on a second deflecting surface of the deflecting unit at different angles from each other with respect to the main scanning section,
the third and fourth imaging optical systems include third and fourth imaging elements, respectively, each imaging element having the largest refractive power in the sub-scanning section in the corresponding one of the third and fourth imaging optical systems,
a distance on an optical path from an axial deflection point on the second deflecting surface to the third imaging element is shorter than a distance on an optical path from the axial deflection point on the second deflecting surface to the fourth imaging element, and
a following condition is satisfied:

$$-\frac{d_4}{N_4}\frac{\phi_{41}}{\phi_4} < -\frac{d_3}{N_3}+\frac{\phi_{31}}{\phi_3},$$

where $N_3$, $d_3$, $\phi_3$, and $\phi_{31}$ represent a refractive index, a thickness on the optical axis, a refractive power in the sub-scanning section, and a refractive power in the sub-scanning section of an incident surface, of the third imaging element, respectively, and $N_4$, $d_4$, $\phi_4$, and $\phi_{41}$ represent a refractive index, a thickness on the optical axis, a refractive power in the sub-scanning section, and a refractive power in the sub-scanning section of an incident surface, of the fourth imaging element, respectively.

5. The optical scanning apparatus according to claim 3, wherein
the first imaging optical system includes a fifth imaging element located on the optical path between the deflecting unit and the first imaging element,
the second imaging optical system includes a sixth imaging element located on the optical path between the deflecting unit and the second imaging element, and
a refractive power in the sub-scanning section of the fifth imaging element is smaller than a refractive power in the sub-scanning section of the sixth imaging element.

6. The optical scanning apparatus according to claim 5, wherein an amount of sagittal tilt of an exit surface of the fifth imaging element is smaller than an amount of sagittal tilt of an exit surface of the sixth imaging element.

7. The optical scanning apparatus according to claim 5, wherein an amount of sagittal tilt of an incident surface of the second imaging element is larger than an amount of sagittal tilt of an incident surface of the first imaging element.

8. The optical scanning apparatus according to claim 5, wherein an amount of sagittal tilt of an incident surface is larger than an amount of sagittal tilt of an exit surface in at least any of the first and second imaging elements.

9. The optical scanning apparatus according to claim 1, wherein a following condition is satisfied:

$$\frac{\phi_{11}}{\phi_1} < \frac{\phi_{21}}{\phi_2}.$$

10. The optical scanning apparatus according to claim 1, wherein following conditions are satisfied:
$|R_{11}|>|R_{12}|$, and
$|R_{21}|<|R_{22}|$,
where $R_{11}$ and $R_{12}$ represent curvature radii in the sub-scanning section of the incident surface and an exit surface of the first imaging element, respectively, and $R_{21}$ and $R_{22}$ represent curvature radii in the sub-scanning section of the incident surface and an exit surface of the second imaging element, respectively.

11. An image forming apparatus comprising:

the optical scanning apparatus according to claim 1;

a developing unit configured to develop electrostatic latent images formed on the first and second scanned surfaces as toner images by the optical scanning apparatus;

a transferring unit configured to transfer the developed toner images to a transferred material; and a fixing unit configured to fix the transferred toner images to the transferred material.

12. An image forming apparatus comprising:

the optical scanning apparatus according to claim 1; and a printer controller configured to convert a signal outputted from an external apparatus into image data and to input the image data to the optical scanning apparatus.

13. An image forming apparatus comprising:

the optical scanning apparatus according to claim 3;

a developing unit configured to develop electrostatic latent images formed on the first and second scanned surfaces as toner images by the optical scanning apparatus;

a transferring unit configured to transfer the developed toner images to a transferred material; and a fixing unit configured to fix the transferred toner images to the transferred material.

14. An image forming apparatus comprising:

the optical scanning apparatus according to claim 3; and a printer controller configured to convert a signal outputted from an external apparatus into image data and to input the image data to the optical scanning apparatus.

\* \* \* \* \*